(12) United States Patent
Kinoshita et al.

(10) Patent No.: US 8,027,049 B2
(45) Date of Patent: Sep. 27, 2011

(54) REMOTE E-MAIL PRINTING

(75) Inventors: Koji Kinoshita, Tokyo (JP); Yohichiroh Higashizaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1143 days.

(21) Appl. No.: 10/309,333

(22) Filed: Dec. 4, 2002

(65) Prior Publication Data

US 2003/0107762 A1  Jun. 12, 2003

(30) Foreign Application Priority Data

Dec. 4, 2001 (JP) ................................. 2001-370239
Dec. 28, 2001 (JP) ................................. 2001-401306

(51) Int. Cl.
*G06F 15/00* (2006.01)
*G06K 1/00* (2006.01)

(52) U.S. Cl. ....... 358/1.15; 358/1.9; 358/1.13; 358/1.16

(58) Field of Classification Search .................. 358/402, 358/403, 1.1, 1.9, 1.11–1.18; 709/206, 245
See application file for complete search history.

(56) References Cited

U.S. PATENT DOCUMENTS

| | | | |
|---|---|---|---|
| 5,353,359 A | 10/1994 | Urabe et al. | |
| 5,862,321 A | 1/1999 | Lamming et al. | |
| 5,903,716 A | 5/1999 | Kimber et al. | 395/114 |
| 5,956,487 A | 9/1999 | Venkatraman et al. | |
| 5,974,401 A | 10/1999 | Enomoto et al. | 705/40 |
| 6,061,502 A | 5/2000 | Ho et al. | 395/114 |
| 6,061,669 A * | 5/2000 | Kelley et al. | 705/400 |
| 6,065,025 A * | 5/2000 | Fujita et al. | 715/520 |
| 6,144,997 A | 11/2000 | Lamming et al. | |
| 6,157,945 A | 12/2000 | Balma et al. | 709/206 |
| 6,246,983 B1 | 6/2001 | Zou et al. | 704/260 |
| 6,280,105 B1 | 8/2001 | Iida | 400/74 |
| 6,282,435 B1 | 8/2001 | Wagner et al. | 455/566 |
| 6,452,692 B1 | 9/2002 | Yacoub | |
| 6,515,988 B1 | 2/2003 | Eldridge et al. | |
| 6,522,421 B2 * | 2/2003 | Chapman et al. | 358/1.15 |
| 6,625,447 B1 | 9/2003 | Rossmann | |
| 6,658,456 B1 * | 12/2003 | Shimoosawa | 709/206 |

(Continued)

FOREIGN PATENT DOCUMENTS

EP         0656581 A1         6/1995

(Continued)

OTHER PUBLICATIONS

Japanese Office Action dated Jun. 17, 2005, directed to counterpart JP application No. 2001-370239 (1 page).

(Continued)

*Primary Examiner* — Thierry L Pham
(74) *Attorney, Agent, or Firm* — Morrison & Foerster LLP

(57) ABSTRACT

An information providing server has information on plural printers. The information providing server provides a user of a portable terminal with the information on the plural printers by sending the information on the plural printers to the portable terminal. The portable terminal sends an e-mail to which a file to be printed is attached to a printer selected by the user. Each of the plural printers has a plurality of print conditions to which different e-mail addresses are respectively assigned. The printer that has received an e-mail specifies a print condition from an e-mail address indicating the destination of the e-mail. The printer then prints the file attached to the received e-mail under the specified print condition.

16 Claims, 36 Drawing Sheets

U.S. PATENT DOCUMENTS

| | | | |
|---|---|---|---|
| 6,674,537 B2 * | 1/2004 | Kadowaki | 358/1.15 |
| 6,708,204 B1 * | 3/2004 | Mizobuchi et al. | 709/206 |
| 6,801,962 B2 | 10/2004 | Taniguchi et al. | |
| 6,934,048 B2 * | 8/2005 | Igarashi et al. | 358/1.15 |
| 6,963,910 B1 * | 11/2005 | Belknap et al. | 709/223 |
| 6,975,419 B2 * | 12/2005 | Staas et al. | 358/1.15 |
| 7,012,709 B2 * | 3/2006 | Sugita | 358/1.15 |
| 7,136,180 B2 * | 11/2006 | Utsunomiya | 358/1.15 |
| 7,167,264 B2 * | 1/2007 | Takamiya | 358/1.15 |
| 7,352,485 B2 | 4/2008 | Kinoshita | |
| 2001/0022662 A1 * | 9/2001 | Hosoda | 358/1.9 |
| 2001/0028465 A1 * | 10/2001 | Sugino | 358/1.9 |
| 2001/0034747 A1 * | 10/2001 | Fujitani et al. | 707/525 |
| 2001/0047303 A1 | 11/2001 | Greenstone | |
| 2002/0051178 A1 * | 5/2002 | Nakayasu et al. | 358/1.15 |
| 2003/0009498 A1 | 1/2003 | Koegler | |
| 2003/0011809 A1 * | 1/2003 | Suzuki et al. | 358/1.15 |
| 2003/0095281 A1 * | 5/2003 | Parry | 358/1.15 |
| 2003/0103224 A1 * | 6/2003 | Johnson et al. | 358/1.13 |

FOREIGN PATENT DOCUMENTS

| | | |
|---|---|---|
| EP | 0 886 206 | 12/1998 |
| EP | 1 107 569 | 6/2001 |
| JP | 05-006383 | 1/1993 |
| JP | 06-337796 | 12/1994 |
| JP | 08-147374 | 6/1996 |
| JP | 08-190489 | 7/1996 |
| JP | 11-122380 | 4/1999 |
| JP | 11-161583 | 6/1999 |
| JP | 2000-203465 | 7/2000 |
| JP | 2001-125622 | 5/2001 |
| JP | 2001-296985 | 10/2001 |
| JP | 2005-250873 | 9/2005 |
| WO | WO-00/41064 | 7/2000 |
| WO | WO 01/48615 | 7/2001 |
| WO | WO 01/80049 A1 | 10/2001 |

OTHER PUBLICATIONS

Japanese Office Action dated Jul. 19, 2005, directed to counter part JP application No. 2001-401306 (2 pages).

Kinoshita, K., U.S. Office Action mailed Dec. 21, 2005, directed to U.S. Appl. No. 10/229,143; 11 pages.

Kinoshita, K., U.S. Office Action mailed Jun. 8, 2006, directed to U.S. Appl. No. 10/229,143; 11 pages.

Kinoshita, K., U.S. Office Action mailed Nov. 27, 2006, directed to U.S. Appl. No. 10/229,143; 14pages.

Kinoshita, K., U.S. Office Action mailed Jun. 7, 2007, directed to U.S. Appl. No. 10/229,143; 14 pages.

* cited by examiner

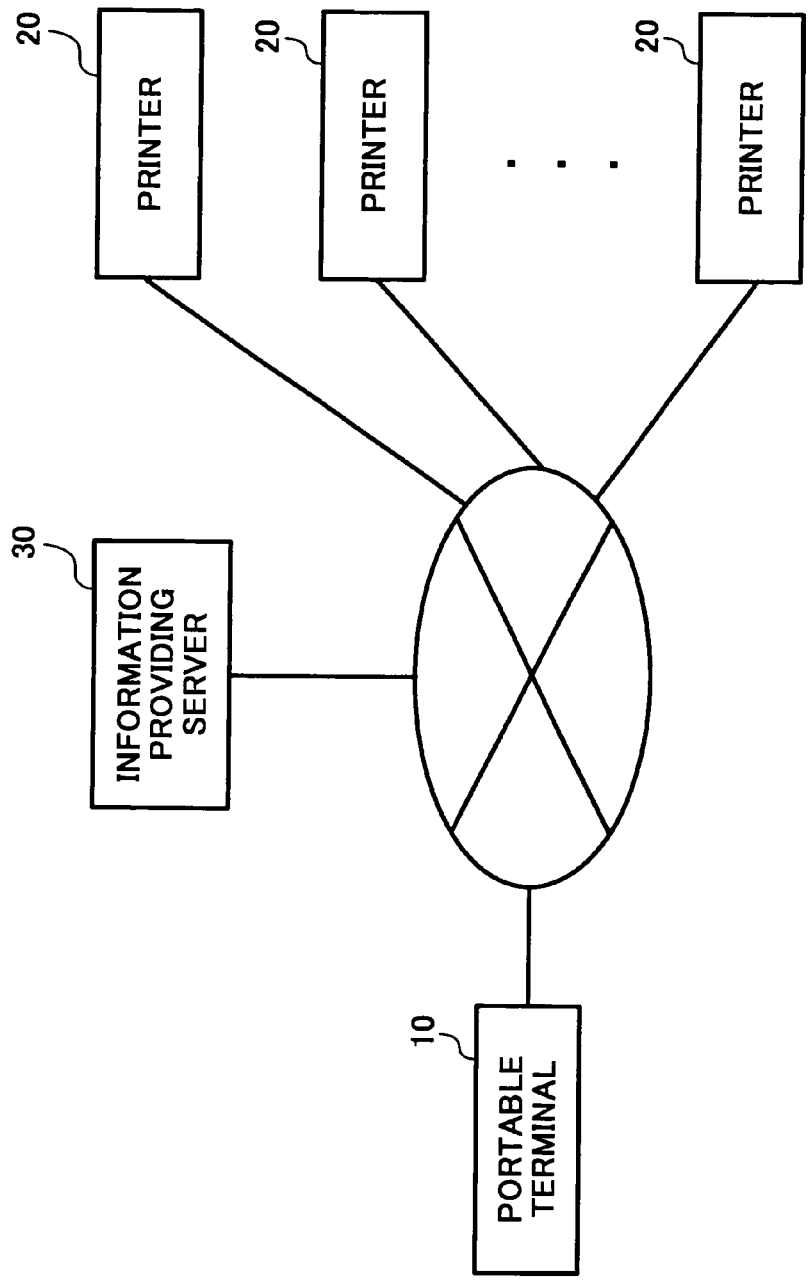

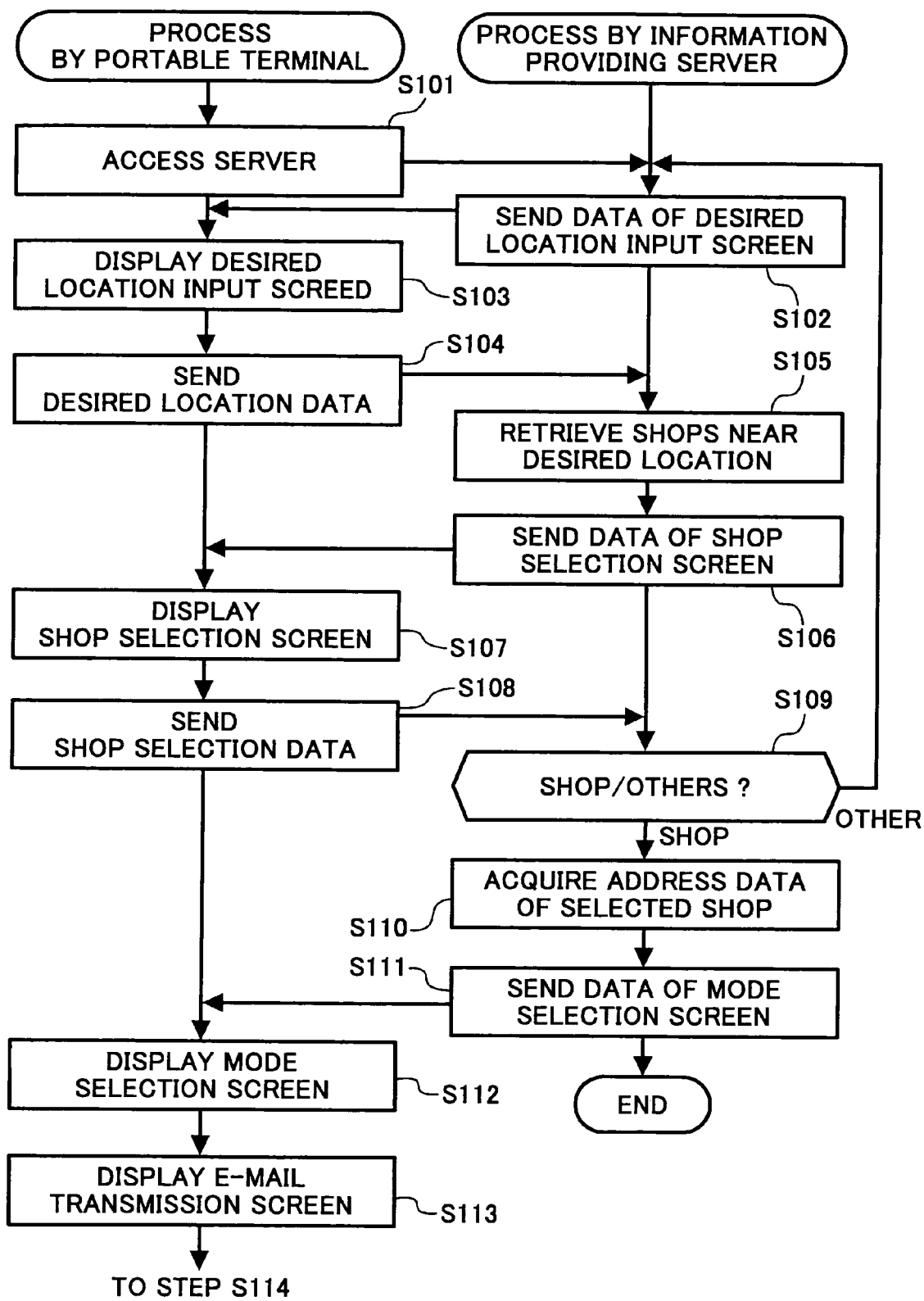

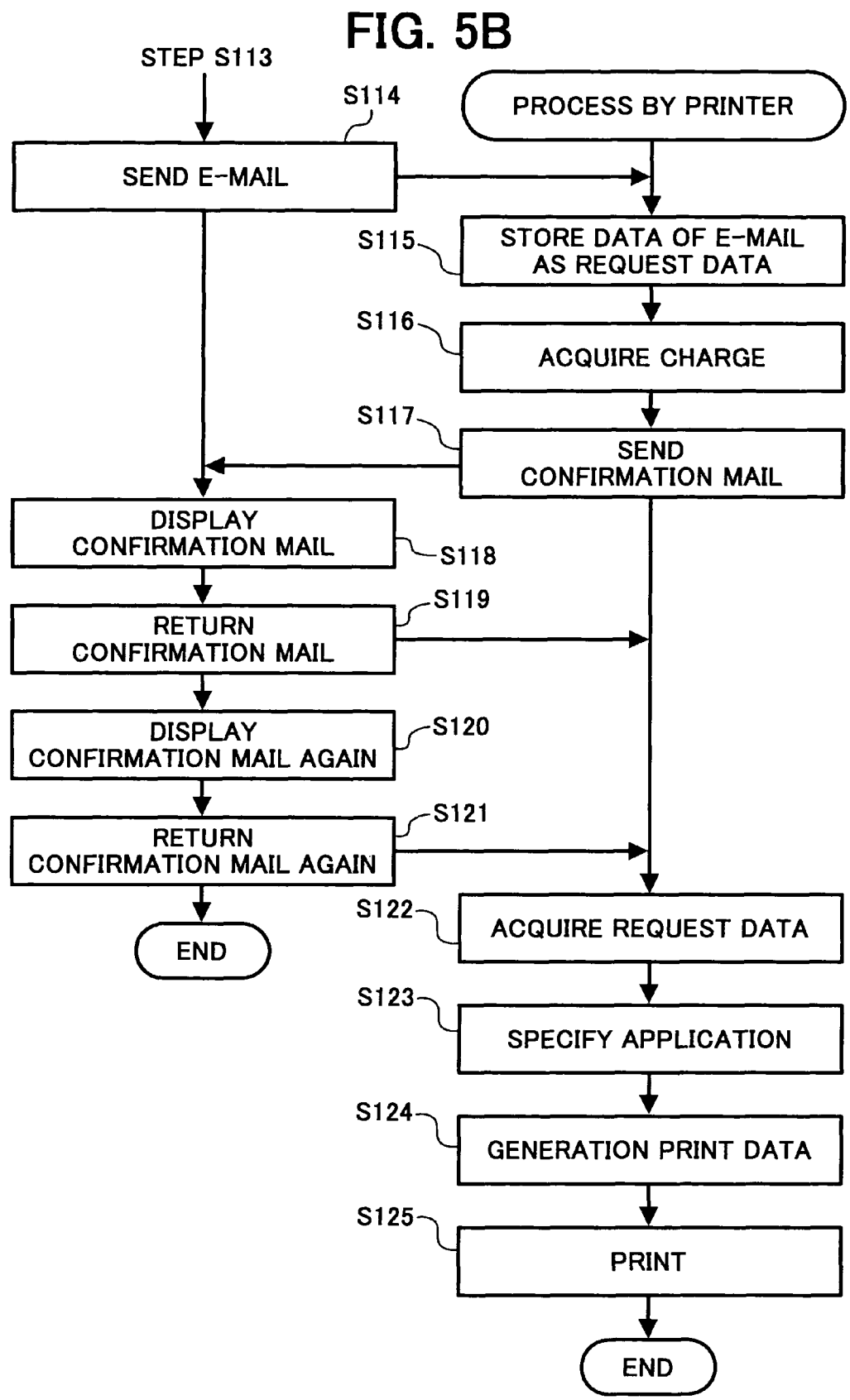

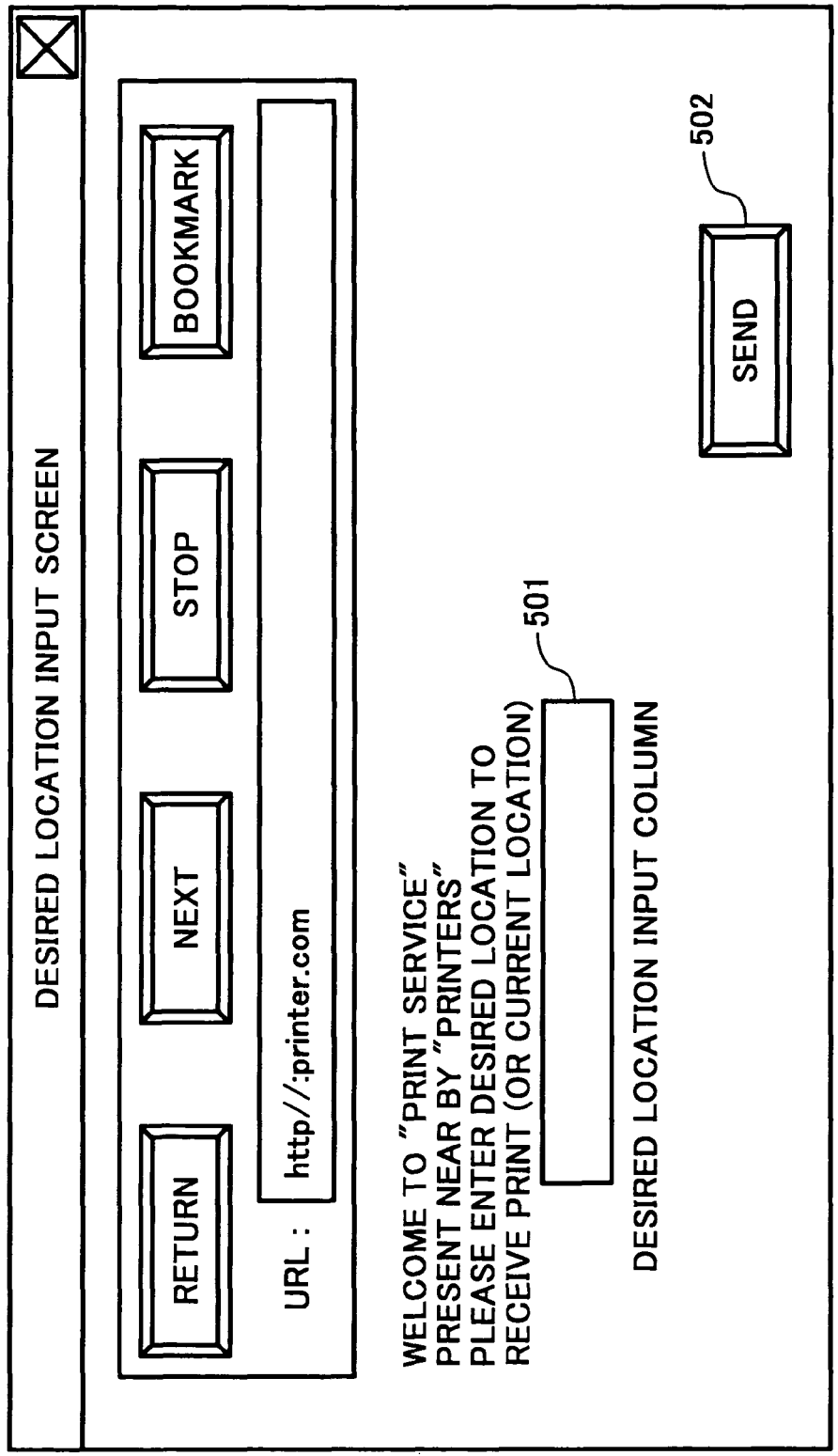

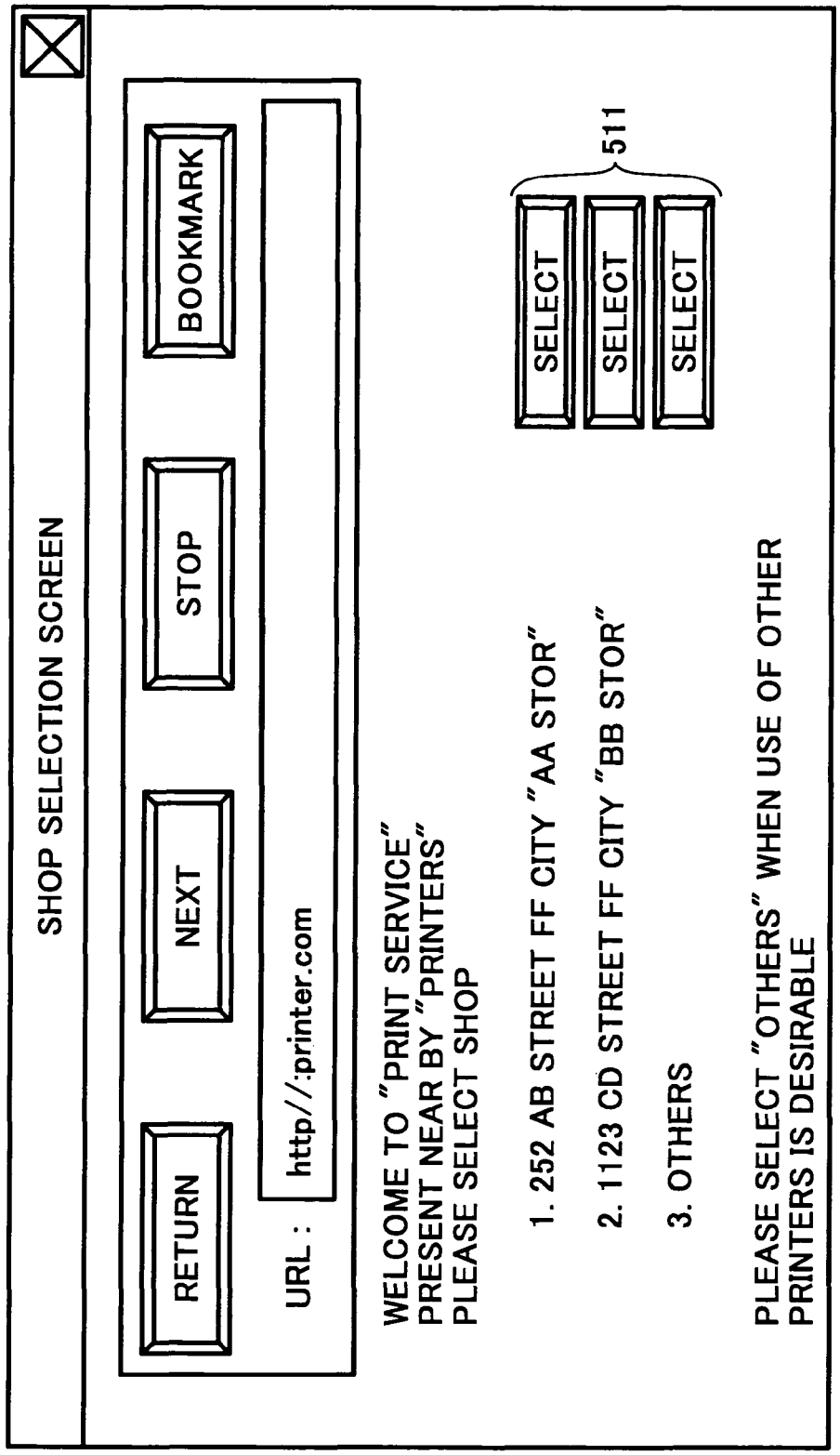

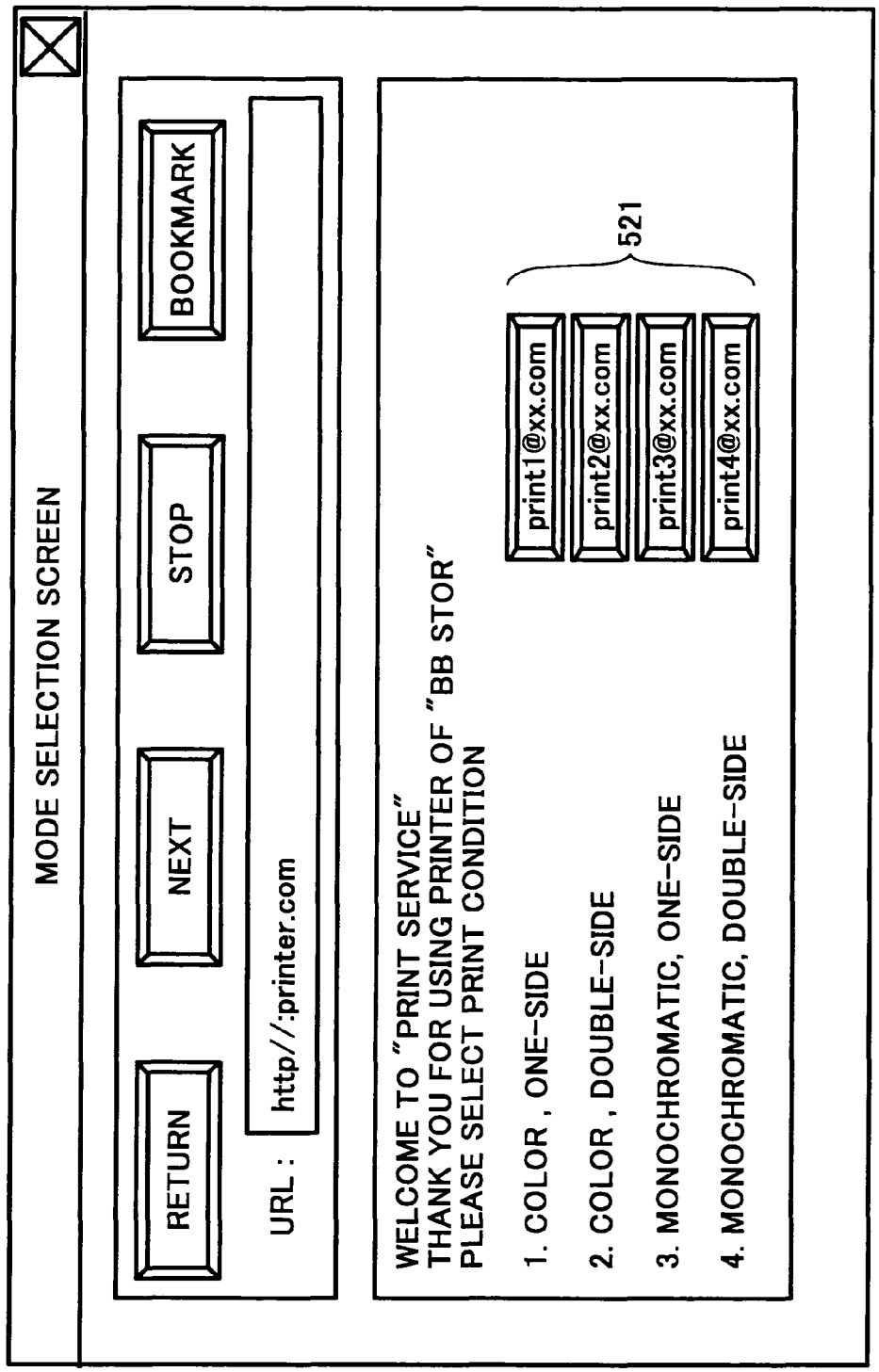

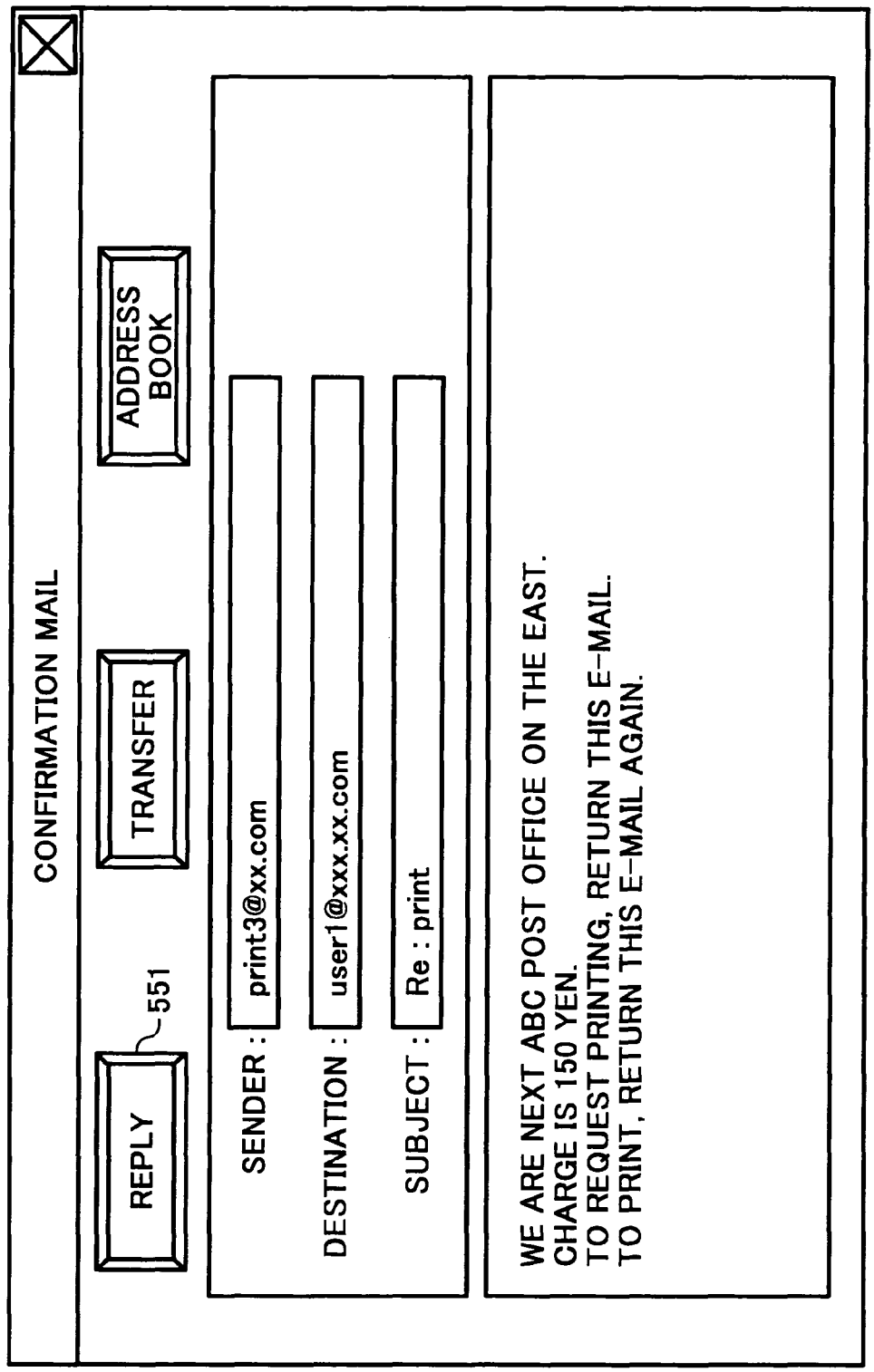

| CONNECTION INFORMATION | USER ID | PASSWORD | E-MAIL ADDRESS | ... |

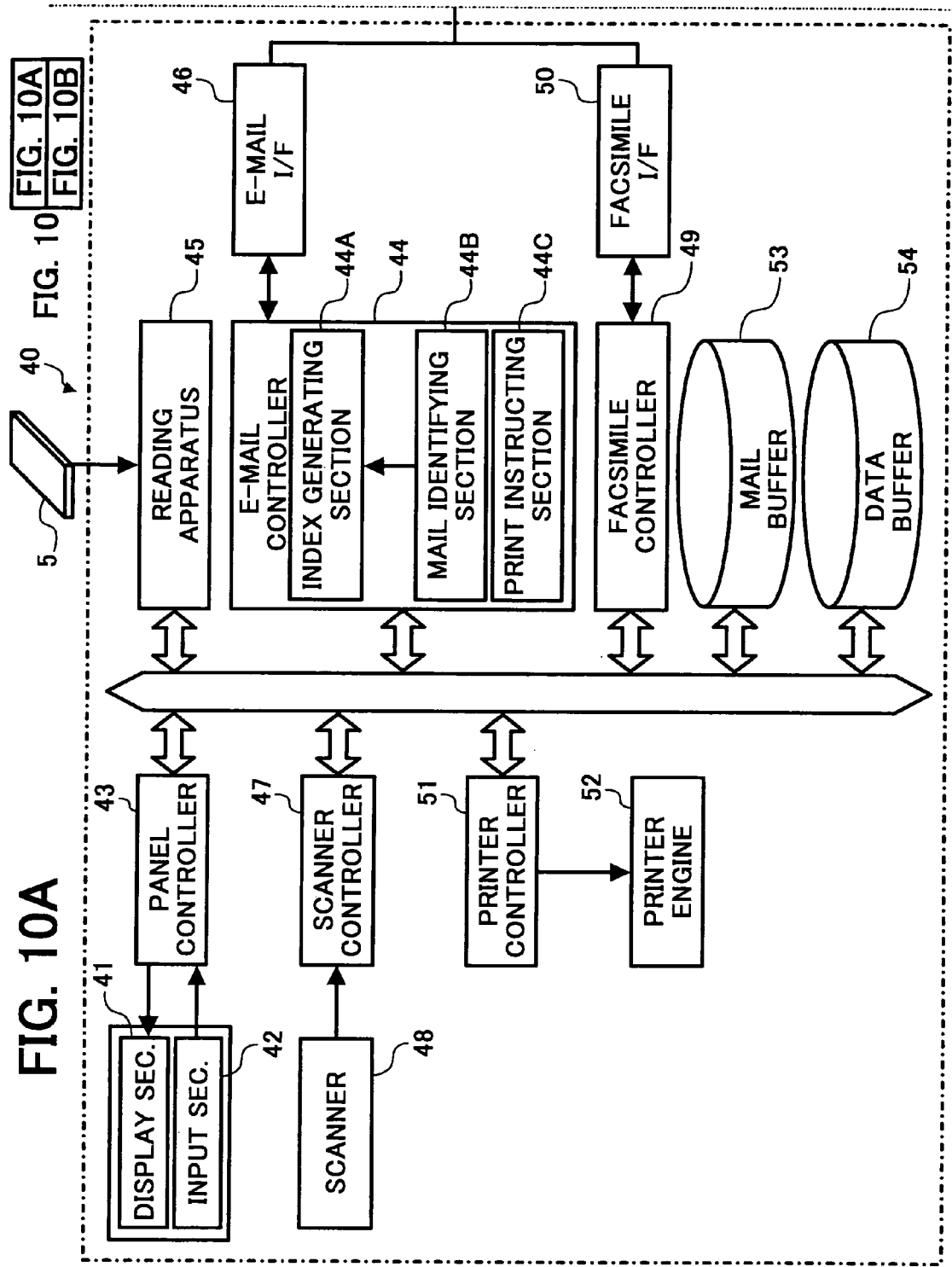

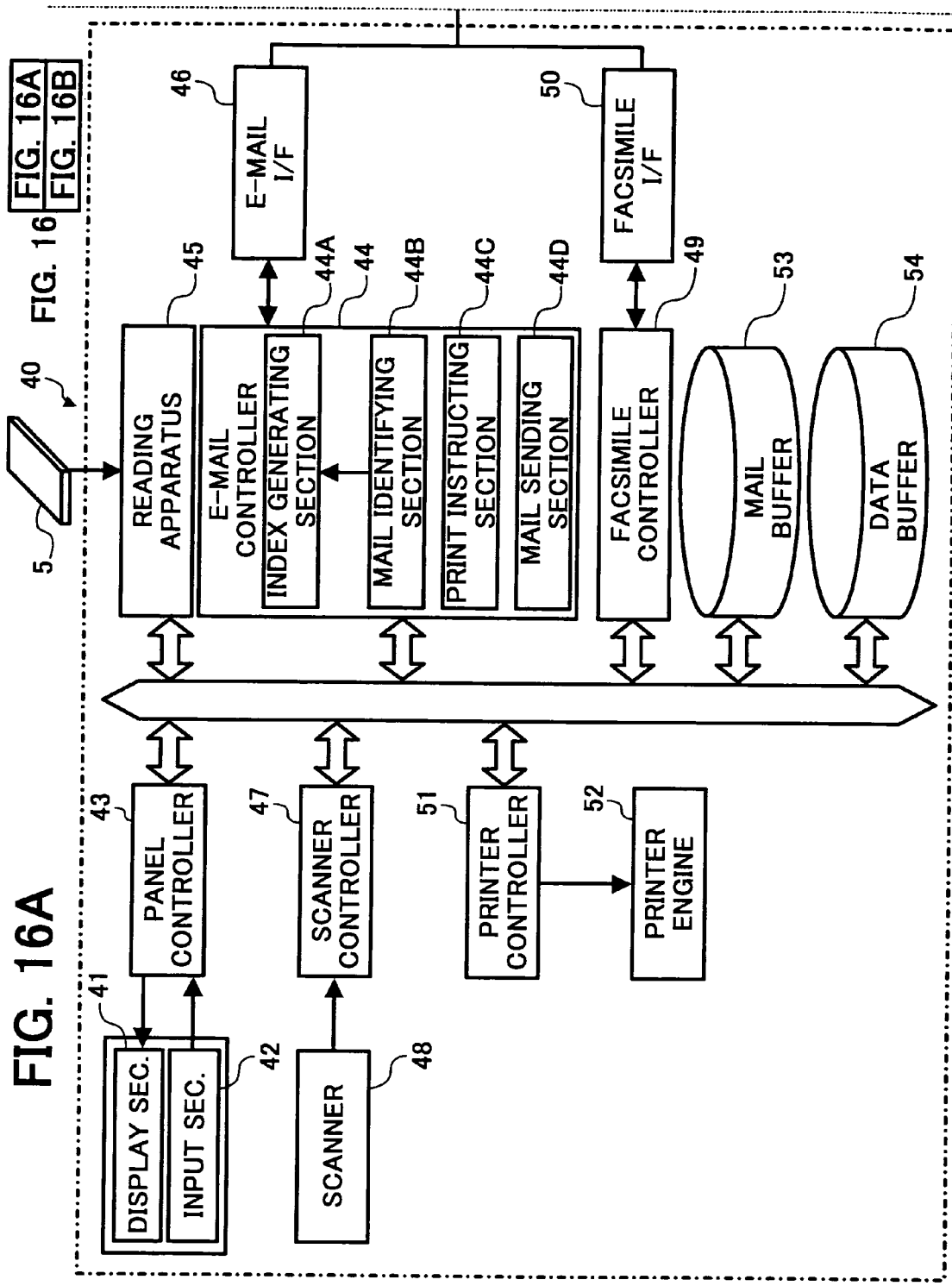

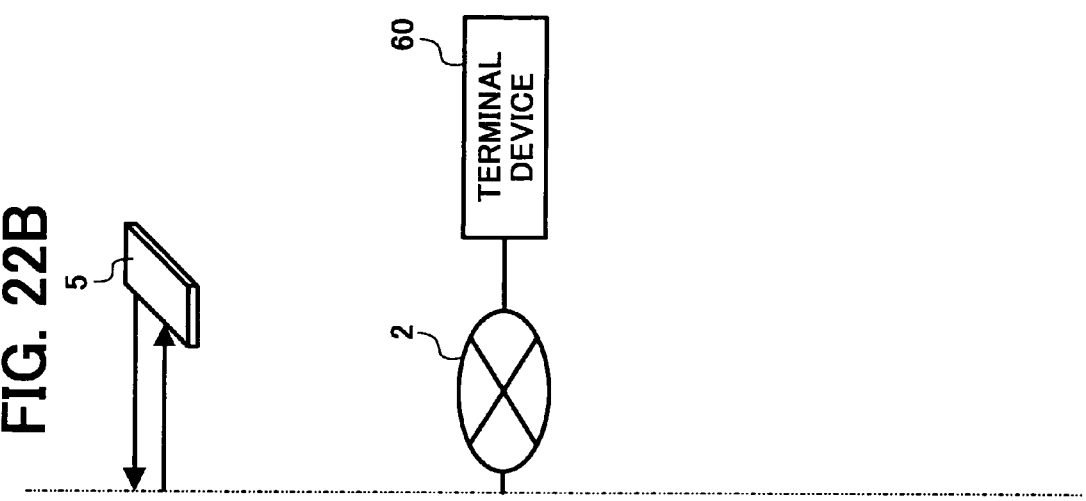

REMOTE E-MAIL PRINTING

BACKGROUND OF THE INVENTION

1. Field of the Invention

The present invention relates to a printing system, a printing apparatus, a printing method and a program.

2. Description of the Related Art

In case of printing a file which is prepared by a user using a computer, the computer converts data of the file to print data and outputs the print data to a printer connected to the computer.

The printer prints the file using the print data supplied from the computer.

There may be a case where a user is out of an office and there are no available printers so that the user cannot execute printing.

Even if there is an available printer, it takes time to set up the connection of a computer to the printer.

SUMMARY OF THE INVENTION

Accordingly, it is an object of the invention to provide a printing system, a printing apparatus, a printing method and a program which ensure easy printing anytime and anywhere.

To achieve the object, a printing apparatus according to the first aspect of the invention comprises:

a receiving unit which receives an e-mail to be sent from an external terminal;

a data generating unit which generates print data for printing a file attached to the e-mail received by the receiving unit; and a printing unit which prints the file by using the print data generated by the data generating unit.

The invention can ensure easy printing anytime and anywhere.

The printing apparatus may further include a memory unit which stores a plurality of application programs for generating the print data, and the data generating unit may specify an application program corresponding to a type of the file and generate the print data using the specified application program.

The printing apparatus may have a plurality of print conditions to which different e-mail addresses are respectively assigned, the printing apparatus may further include a condition specifying unit which specifies a print condition from an e-mail address indicating a destination of the e-mail received by the receiving unit, and the printing unit may print the file under the print condition specified by the condition specifying unit.

The printing apparatus may further include:

a charge calculating unit which acquires a charge for printing the file; and a charge indicating unit which indicates the charge acquired by the charge calculating unit to a sender of the e-mail.

The charge indicating unit may indicate the charge to the sender by sending an e-mail indicating the charge.

The printing unit may start printing in response to a print execution instruction from a sender of said e-mail.

The print execution instruction may be supplied to the printing unit by an e-mail.

The printing apparatus may further include:

a number issuing unit which issues a receipt number to a sender of the e-mail, and a number input unit through which the sender inputs the receipt number; and the printing unit may start printing in response to the sender's inputting the receipt number by operating the number input unit.

The printing apparatus may further include an amount discriminating unit which has a money slot to place money and discriminates an amount of money deposited, and the printing unit may start printing when the amount of money discriminated by the amount discriminating unit becomes equal to or greater than the charge acquired by the charge calculating unit.

A printing apparatus according to the second aspect of the invention comprises:

a downloader which downloads an object to be printed, stored in an external terminal, from the external terminal; and a printing unit which prints the object to be printed downloaded by the downloader.

The printing apparatus may further include:

a medium slot to insert a portable recording medium on which data for connecting the printing apparatus to the external terminal is stored, and a reading unit which reads the data recorded on the portable recording medium inserted into the medium slot; and the downloader downloads the object to be printed from the external terminal using the data read by the reading unit.

The downloader may download one or more pieces of data stored in the external terminal, the printing apparatus may further include an index generating unit which generates indexes of the one or more pieces of data downloaded by the downloader, and a display unit which displays an index screen showing the indexes generated by the index generating unit, thereby allowing a user to select the object to be printed, and the printing unit may print, as the object to be printed, data selected on the index screen by the user.

The one or more pieces of data may be one or more e-mails sent to the user, the printing apparatus may further include a mail extracting unit which extracts an unopened e-mail from the one or more e-mails downloaded by the downloader, and the display unit may display an index screen showing an index of the e-mail extracted by the mail extracting unit.

The printing apparatus may further include a mail sending unit which sends a reply mail corresponding to an e-mail printed by the printing unit.

The printing apparatus may further include a statement memory unit which stores data on a plurality of fixed statements, the display unit may display a statement list screen showing a list of the plurality of fixed statements stored in the statement memory unit, thereby allowing a user to select a fixed statement to be lo used in the reply mail, and the mail sending unit may prepare the reply mail using the fixed statement selected on the statement list screen by the user.

The printing apparatus may further include a statement acquisition unit which acquires reply statement data to be used in the reply mail from an external device, and the mail sending unit may prepare the reply mail using the reply statement data acquired by the statement acquisition unit.

The portable recording medium may store reply statement data to be used in the reply mail, the reading unit may read the reply statement data from the portable recording medium inserted into the medium slot, and the mail sending unit may prepare the reply mail using the reply statement data read by the reading unit.

The printing apparatus may further have a deleting unit which deletes data of the e-mail downloaded by the downloader.

The downloader may acquire storage information indicating names and storage positions of one or more pieces of data, stored in the external terminal, from the external terminal, the printing apparatus may further include a display unit which displays a data list screen showing a list of data stored in the external terminal using the storage information acquired by the downloader, thereby allowing a user to select an object to be printed, and the downloader may download data selected on the data list screen by the user as the object to be printed.

A printing system according to the third aspect of the invention comprises:

one or more printing apparatuses that print a file attached to an e-mail sent from a terminal device which is operated by a user; and an information providing terminal which has information on the one or more printing apparatuses and provides the user with the information on the one or more printing apparatuses, the information providing terminal including an apparatus information memory unit which stores the information on the one or more printing apparatuses and a transmitting unit which sends the terminal device that information among pieces of information stored in the apparatus information memory unit which is about a printing apparatus selected by the user, thereby providing the user with the information on the printing apparatus selected by the user.

The information providing terminal may further include:

a location memory unit which stores location data indicating set-up locations of the one or more printing apparatuses, a requesting unit which makes a request of the user to provide a desired location to execute printing, a retrieval unit which retrieves one or more printing apparatuses located near the desired location provided by the user, in accordance with a predetermined rule, by using the location data stored in the location memory unit, and a location providing unit which provides the user with the one or more printing apparatuses retrieved by the retrieval unit by sending the set-up locations of the one or more printing apparatuses retrieved by the retrieval unit to the terminal device; and the transmitting unit may provide the user with information of a printing apparatus set up at that one of the set-up locations of the one or more printing apparatuses provided by the location providing unit which is selected by the user.

Each of the one or more printing apparatuses may have a plurality of print conditions to which different e-mail addresses are respectively assigned, each of the one or more printing apparatuses may comprise:

a condition specifying unit which specifies a print condition from an e-mail address indicating a destination of an e-mail sent from the terminal device, and a printing unit which prints the file under the print condition specified by the condition specifying unit.

A printing method according to the fourth aspect of the invention comprises:

a mail sending step of allowing a terminal device operated by a user to send a printing apparatus an e-mail to which a file to be printed is attached;

a receiving step of allowing said printing apparatus to receive the e-mail sent from the external terminal;

a data generating step of allowing said printing apparatus to generate print data for printing a file attached to the received e-mail; and a printing step of allowing said printing apparatus to print the file by using the print data generated in the data generating step.

The printing apparatus may have a plurality of print conditions to which different e-mail addresses are respectively assigned, the printing method may further include a condition specifying step of allowing the printing apparatus to specify a print condition from an e-mail address indicating a destination of the e-mail, and the printing step may include a step of allowing the printing apparatus to print the file under the print condition specified in the condition specifying step.

A printing method according to the fifth aspect of the invention is executed by a printing apparatus, and comprises:

a downloading step of downloading an object to be printed, stored in an external terminal, from the external terminal; and a printing step of printing the object to be printed downloaded in the downloading step.

The printing apparatus may have:

a medium slot to insert a portable recording medium on which data for connecting the printing apparatus to the external terminal is stored, and the printing method may further include a reading step of reading the data recorded on the portable recording medium inserted into the medium slot; and the downloading step may include a step of downloading data of the object to be printed from the external terminal using the data read in the reading step.

A program according to the sixth aspect of the invention allows a computer connectable to a printer to serve as a printing apparatus comprising:

a receiving unit which receives an e-mail to be sent from an external terminal;

a memory unit which stores a plurality of print conditions to which different e-mail addresses are respectively assigned;

a condition specifying unit which specifies a print condition from an e-mail address indicating a destination of the e-mail received by the receiving unit and memory contents of the memory unit; and a printing unit which controls the printer to print a file attached to the e-mail received by the receiving unit under the print condition specified by the condition specifying unit.

A program according to the seventh aspect of the invention allows a computer connectable to a printer and a reading apparatus for reading data recorded on a portable recording medium to serve as a printing apparatus comprising:

a reading unit which controls the reading apparatus to read data, which is necessary for downloading an object to be printed from an external terminal, recorded on the portable recording medium;

a downloader which downloads the object to be printed from the external terminal using the data read by the reading unit; and a printing unit which controls the printer to print the object to be printed downloaded by the downloader.

BRIEF DESCRIPTION OF THE DRAWINGS

This object and other objects and advantages of the present invention will become more apparent upon reading of the following detailed description and the accompanying drawings in which:

FIG. 1 is a structural diagram of a printing system according to a first embodiment;

FIGS. 5A and 5B are flowcharts illustrating operations which are performed by the portable terminal, printers and information providing server;

FIG. 6A is a diagram showing a desired location input screen displayed by the portable terminal, FIG. 6B is a diagram showing a shop selection screen displayed by the portable terminal, FIG. 6C is a diagram showing a mode selection screen displayed by the portable terminal, FIG. 6F is a diagram showing a confirmation mail displayed by the portable terminal;

DETAILED DESCRIPTION OF THE PREFERRED EMBODIMENTS

First Embodiment

A printing system according to the first embodiment of the invention will be described below with reference to the accompanying drawings.

The following description of the first embodiment will be given of the case where a user requests a printer located nearby to do printing by using a portable terminal and the requested printer executes printing.

As shown in FIG. 1, the printing system according to the first embodiment comprises a network 1, a portable terminal 10, a plurality of printers 20 and an information providing server 30.

The network 1 is comprised of the Internet or the like. The portable terminal 10, the printers 20 and the information providing server 30 communicate with one another over the network 1.

Figure 2A:
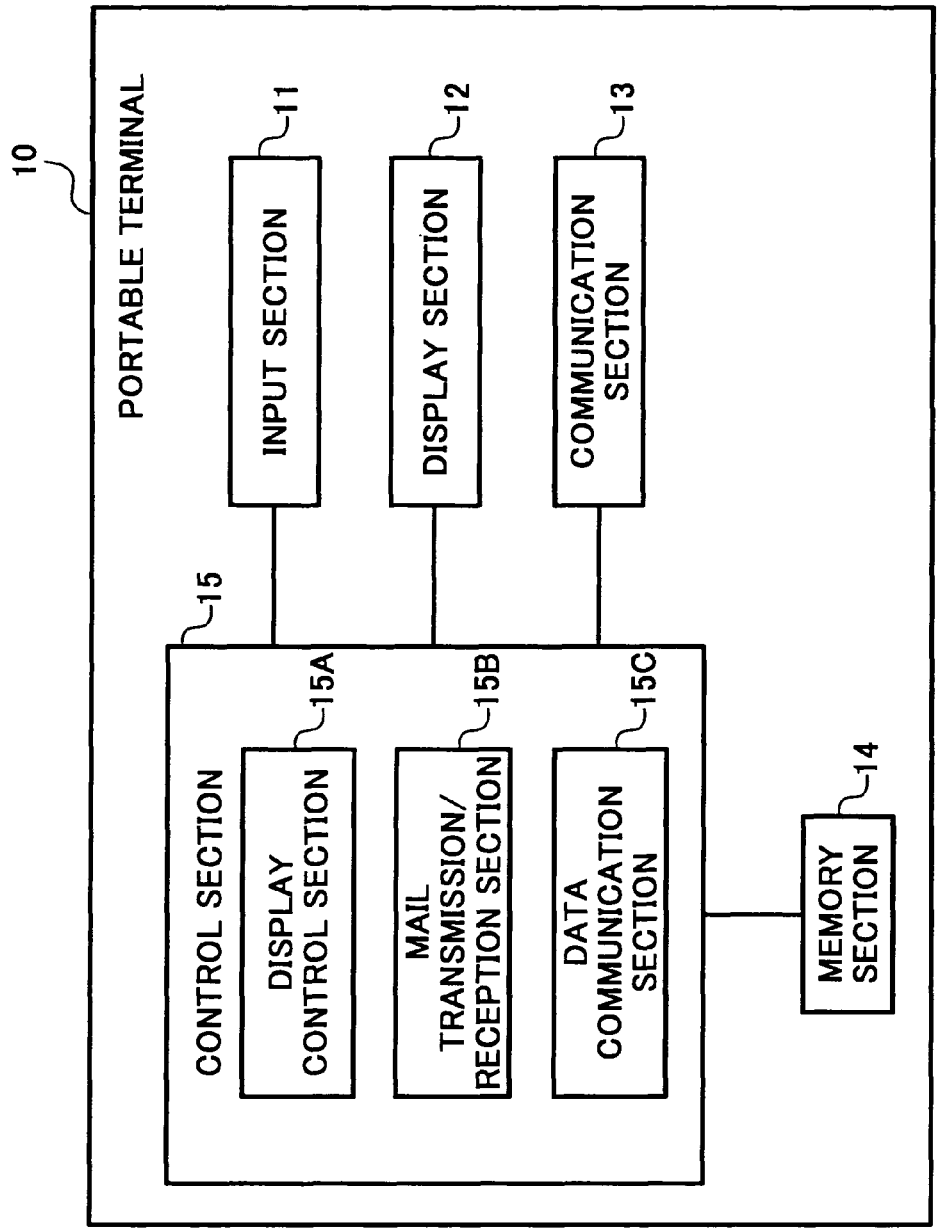
FIG. 2A is a structural diagram of a portable terminal which constitutes the printing system in FIG. 1.

The portable terminal 10 is a notebook type computer, a portable telephone or a PDA (Personal Digital Assistant) or the like. The portable terminal 10 comprises an input section 11, a display section 12, a communication section 13, a memory section 14 and a control section 15, as shown in FIG. 2A.

The input section 11 has a plurality of input keys or the like and is operated by a user. The input section 11 inputs various instructions and data to the control section 15 in accordance with the user's manipulation.

The display section 12 has a liquid crystal panel and displays various screens.

The communication section 13 has a communication module or the like and controls communication with the printers 20 and the information providing server 30 that is carried out over the network 1.

The memory section 14 comprises a RAM (Random Access Memory) and ROM (Read Only Memory) or the like, and stores various programs and data for operating the portable terminal 10. For example, the memory section 14 stores a browser program for displaying various screens, e-mail software for transmitting and receiving e-mails, and a data communication program for transmitting and receiving various kinds of data over the network 1. The memory section 14 stores a file to be printed, which contains a text, an image and/or figure.

The control section 15 is comprised of a CPU (Central Processing Unit) or the like and operates the portable terminal 10 in accordance with a program stored in the memory section 14.

For example, the control section 15 executes display of screens, transmission and reception of e-mails and transmission and reception of data in accordance with the program in the memory section 14. That is, the control section 15 executes the program in the memory section 14 to function as a display control section 15A, a mail transmission/reception section 15B and a data communication section 15C.

The plural printers 20 are set up in a plurality of shots, such as convenient stores and bookstores.

Each printer 20 is given e-mail addresses whose quantity is set according to the printing performance. Specifically, a single e-mail address is assigned to each of print modes of each printer 20.

In case where one printer 20 has four print modes of "monochromatic printing, one-side printing", "monochromatic printing, double-side printing", "color printing, one-side printing" and "color printing, double-side printing", for example, that printer 20 is given four e-mail addresses (e.g., print1@xx.com, print2@xx.com print3@xx.com and print4@xx.com).

Figure 2B:
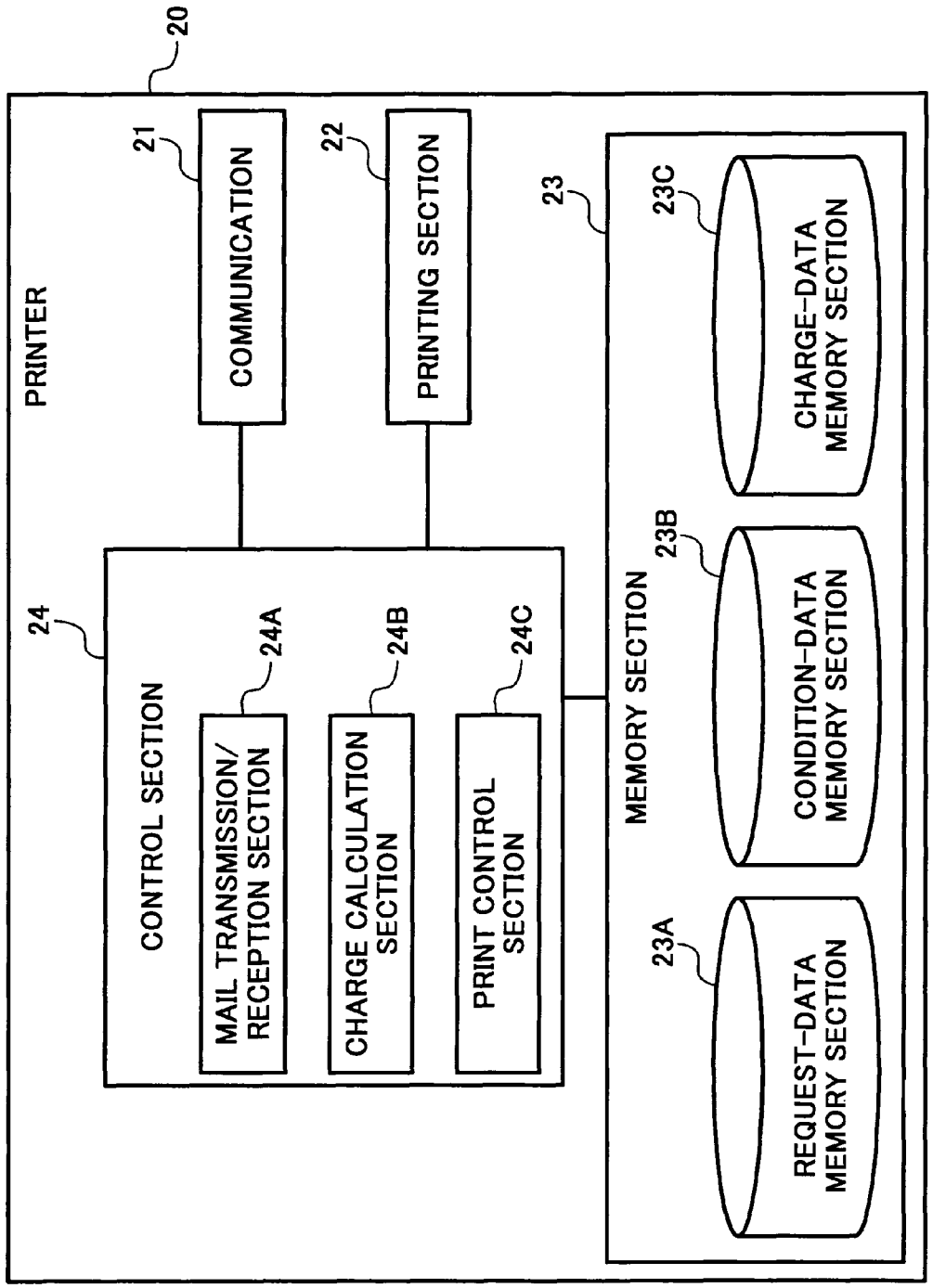
FIG. 2B is a structural diagram of a printer which constitutes the printing system in FIG. 1.

As shown in FIG. 2B, each printer 20 comprises a communication section 21, a printing section 22, a memory section 23 and a control section 24.

The communication section 21 has a communication module or the like and controls communication with the portable terminal 10 and the information providing server 30 that is carried out over the network 1.

The printing section 22 has sheets of print paper, a printer head, etc. and executes printing.

The memory section 23 comprises a RAM, ROM and a hard disk or the like, and stores a program and data for operating the printer 20. For example, the memory section 23 stores a plurality of application programs which generate print data for executing printing. The memory section 23 has a request-data memory section 23A, a condition-data memory section 23B and a charge-data memory section 23C to store request data, condition data and charge data.

Figure 3A:
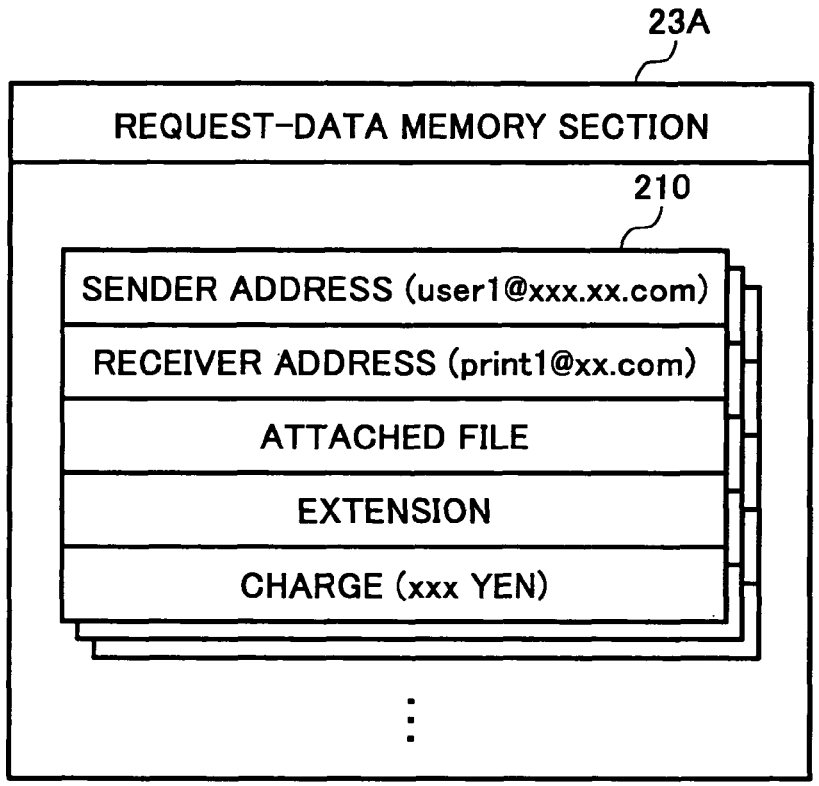
FIG. 3A is a diagram showing data to be stored in a request-data memory section provided in the printer.

As shown in FIG. 3A, request data 210 stored in the request-data memory section 23A represents information on a print requested by the user. Specifically, the request data 210 is constructed by associating pieces of data representing a sender address, a receiver address, an attached file, an extension and a charge with one another.

The "sender address" is an e-mail address the user as requester has. The "receiver address" is an e-mail address assigned to the print mode that is selected by the user. The "attached file" is a file to be printed which is attached to an e-mail for requesting printing. The "extension" is an extension affixed to the file name of an attached file and is used to specify an application program that has created the attached file. The "charge" is a charge for printing the user has requested.

Figure 3B:
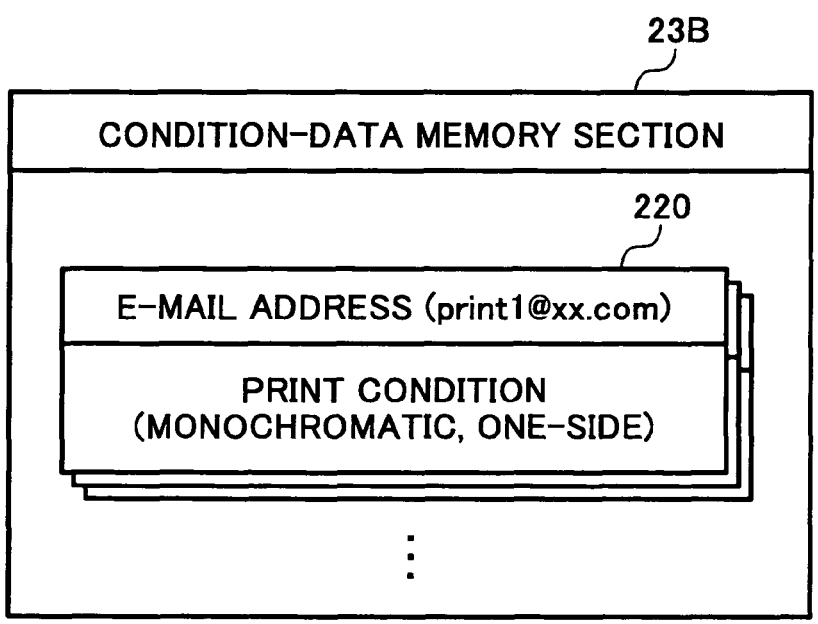
FIG. 3B is a diagram showing data to be stored in a condition-data memory section provided in the printer.

As shown in FIG. 3B, condition data 220 stored in the condition-data memory section 23B represents a plurality of print conditions (print modes) set in the printer 20. Specifically, the condition data 220 is constructed by associating pieces of data representing the print conditions and e-mail addresses with one another.

Figure 3C:
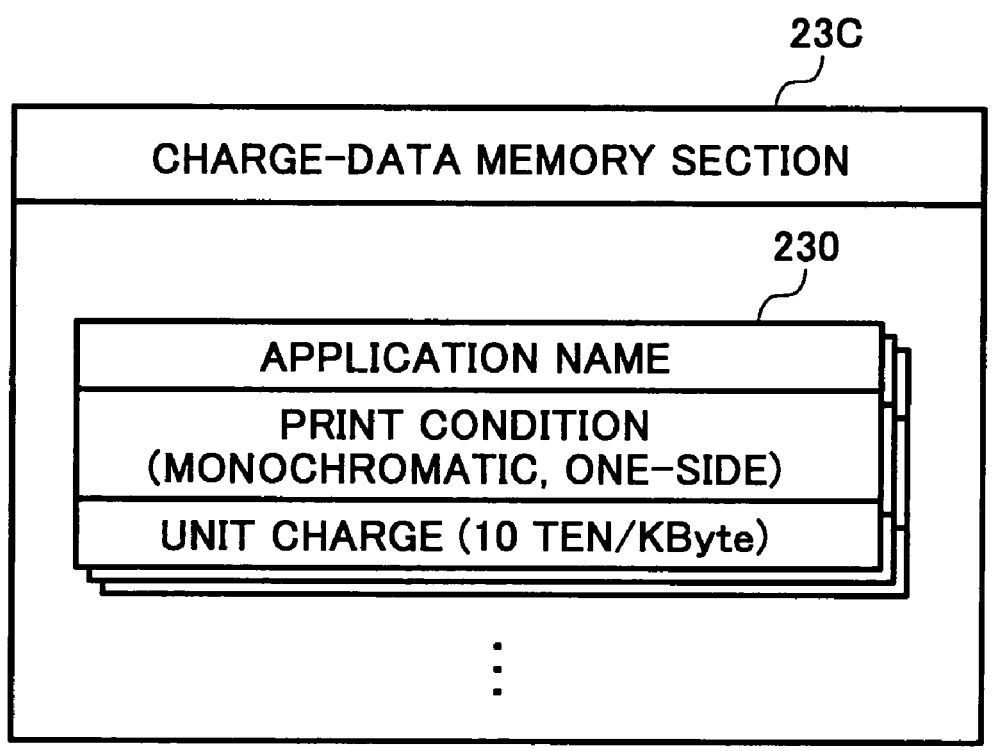
FIG. 3C is a diagram showing data to be stored in a charge-data memory section provided in the printer.

As shown in FIG. 3C, charge data 230 stored in the charge-data memory section 23C represents a unit charge for printing. Specifically, the charge data 230 is constructed by associating pieces of data representing the name of an application program for generating print data, a print condition (print mode) and a unit charge with one another. Apparently, the unit charge is set for each application program to be used and each print condition.

The control section 24 is comprised of a CPU or the like and operates the printer 20 in accordance with a program stored in the memory section 23.

For example, the control section 24 executes transmission and reception of an e-mail, calculation of a print charge, printing and so forth in accordance with the program in the memory section 23. That is, the control section 24 executes program in the memory section 23 to function as a mail transmission/reception section 24A, a charge calculation section 24B and a print control section 24C.

The information providing server 30 has information on the plural printers 20 and provides information on the printers 20 in accordance with a request from the portable terminal 10.

Figure 2C:
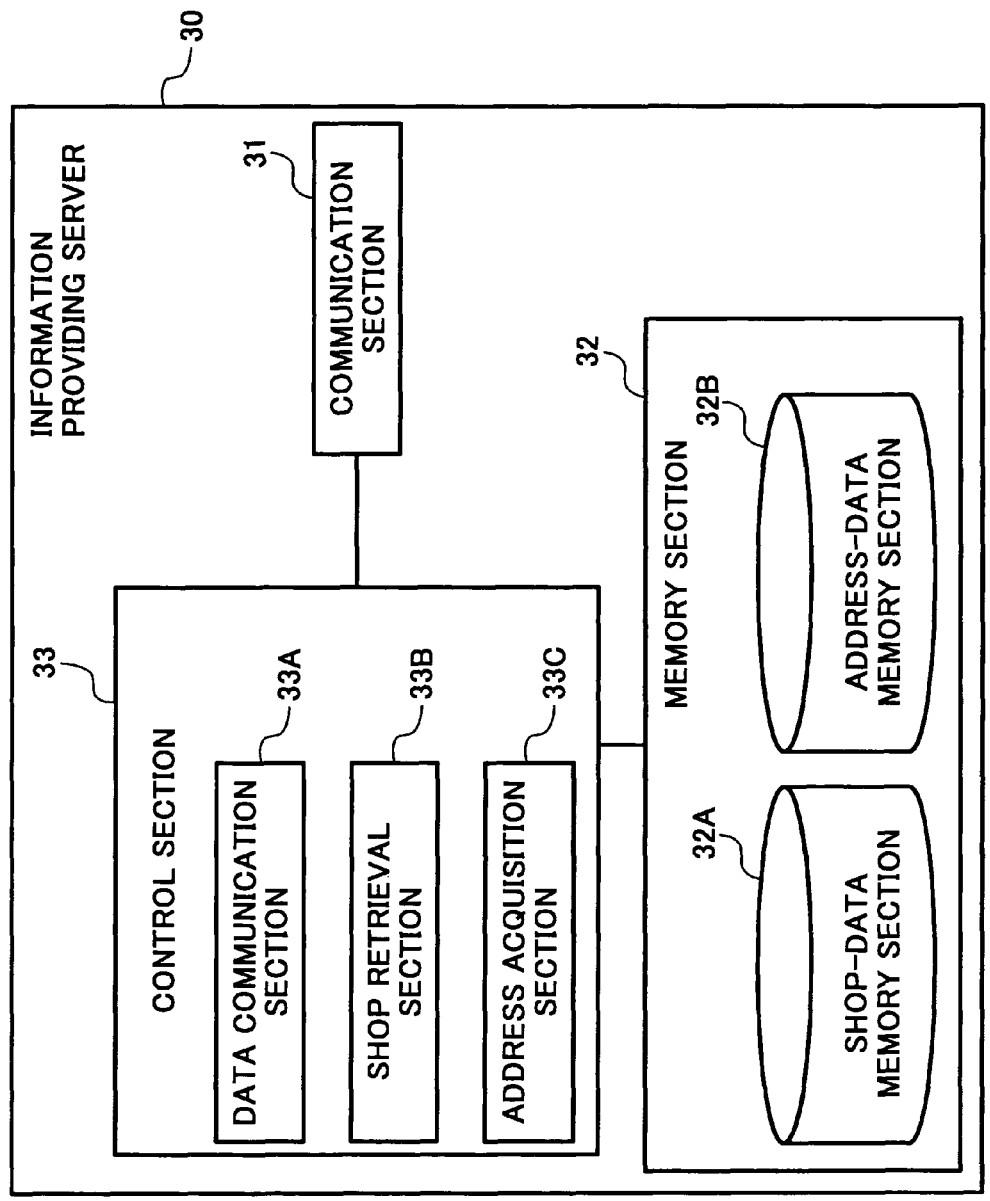
FIG. 2C is a structural diagram of an information providing server which constitutes the printing system in FIG. 1.

The information providing server 30 comprises a communication section 31, a memory section 32 and a control section 33 as shown in FIG. 2C.

The communication section 31 has a communication module or the like and controls communication with the portable terminal 10 and the printers 20 that is carried out over the network 1.

The memory section 32 comprises a RAM, ROM and a hard disk or the like, and stores a program and data for operating the information providing server 30. For example, the memory section 32 stores data on various screens to be displayed by the portable terminal 10. The memory section 32 has a shop-data memory section 32A and an address-data memory section 32B to store shop data and address data.

Figure 4A:
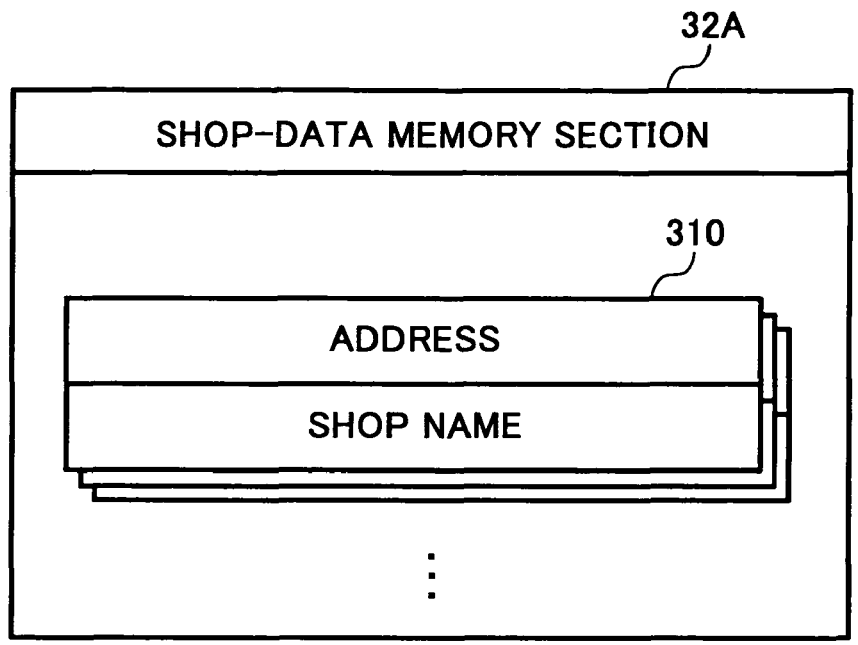
FIG. 4A is a diagram showing data to be stored in a shop-data memory section provided in the information providing server.

As shown in FIG. 4A, shop data 310 stored in the shop-data memory section 32A represents a shop where an associated printer 20 is located. Specifically, the shop data 310 is constructed by associating pieces of data representing the address and name of the shop where the associated printer 20 is located with one another.

Figure 4B:
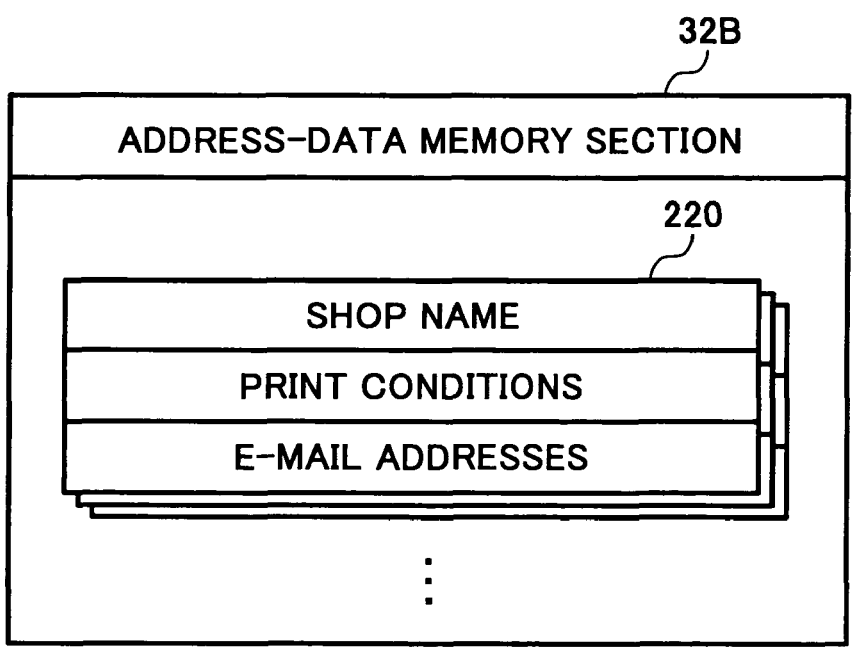
FIG. 4B is a diagram showing data to be stored in an address-data memory section provided in the information providing server.

As shown in FIG. 4B, address data 320 stored in the address-data memory section 32B represents e-mail addresses each printer 20 has. Specifically, the address data 320 is constructed by associating pieces of data representing the name of a shop where an associated printer 20 is located, the print conditions (print modes) the printer 20 has, and e-mail addresses assigned to the respective print modes with one another.

The control section 33 is comprised of a CPU or the like and operates the information providing server 30 in accordance with a program stored in the memory section 32.

For example, the control section 33 executes transmission and reception of data, retrieval of a shop specified by the user and acquisition of e-mail addresses the printer 20 specified by the user has, in accordance with the program in the memory section 32. That is, the control section 33 executes the program in the memory section 32 to function as a data communication section 33A, a shop retrieval section 33B and an address acquisition section 33C.

The operation of the printing system according to the first embodiment will be discussed below.

FIGS. 5A and 5B are flowcharts illustrating operations which are performed by the portable terminal 10, the printers 20 and information providing server 30.

The operation of the printing system is separated into two: print request and execution of printing.

(Print Request)

To begin with, an operation at the time a user requests printing will be discussed.

The portable terminal 10 accesses the information providing server 30 over the network 1 in accordance with an operation of the user (step S101).

In response to the access from the portable terminal 10, the data communication section 33A of the information providing server 30 acquires data of a desired location input screen for inputting a desired location where printing is to be executed from the memory section 32 and transmits the data to the portable terminal 10 (step S102). Accordingly, the data communication section 33A requests the user to enter the desired location.

The display control section 15A of the portable terminal 10 controls the display section 12 to display the desired location input screen upon reception of the data of the desired location input screen supplied from the information providing server 30 (step S103).

The desired location input screen is provided with space 501 to enter a desired location. The desired location input screen is also provided with a Send button 502 for sending the entered location to the information providing server 30.

The user operates the input section 11 of the portable terminal 10 to enter a desired location in the space 501. In case where the current position of the user is "AB street FF city" and the user wants to receive a print near the current position, for example, the user enters "AB street FF city" in the space 501. Then, the user clicks the Send button 502 by operating the input section 11.

The data communication section 15C of the portable terminal 10 sends desired location data indicating the desired location entered in the space 501 to the information providing server 30 in response to clicking made by the user (step S104).

The shop retrieval section 33B of the information providing server 30 access the shop-data memory section 32A in response to the desired location data supplied from the portable terminal 10. Then, the shop retrieval section 33B retrieves shops located nearby the desired location indicated by the desired location data in accordance with a predetermined rule. The shop retrieval section 33B acquires the shop data 310 of the retrieved shops from the shop-data memory section 32A and supplies the acquired data to the data communication section 33A (step S105).

The data communication section 33A of the information providing server 30 generates data of a shop selection screen which shows the contents of the supplied shop data 310 and sends the generated data to the portable terminal 10 (step S106).

The display control section 15A of the portable terminal 10 controls the display section 12 to display the shop selection screen upon reception of the data of the shop selection screen supplied from the information providing server 30 (step S107).

As shown in FIG. 6B, the shop selection screen shows a list of the names and addresses of shops located near the desired location. The shop selection screen is provided with a plurality of Select buttons 511 for selecting a shop at which the user wants to receive a print. The list of shops includes an item "Others" to select other shops than those displayed.

The user clicks one of the Select buttons 511 provided on the shop selection screen by operating the input section 11 of the portable terminal 10 to select a desired shop or "Others".

In response to clicking made by the user, the data communication section 15C of the portable terminal 10 sends shop selection data representing the result of selection made by the user to the information providing server 30 (step S108).

In response to the shop selection data supplied from the portable terminal 10, the address acquisition section 33C of the information providing server 30 discriminates whether the user has selected a shop or "Others" by using the supplied shop selection data (step S109).

In case where it is discriminated that "Others" has been selected (OTHER in step S109), the flow returns to step S102. Accordingly, the information providing server 30 requests the user to enter another desired location.

In case where it is discriminated that a shop has been selected (SHOP in step S109), on the other hand, the address acquisition section 33C acquires the address data 320 associated with the shop indicated by the supplied shop selection data from the address-data memory section 32B (step S110).

In case where the user has selected "BB Store" on the shop selection screen exemplified in FIG. 6B, for example, the address acquisition section 33C acquires the address data 320 of "BB Store" from the address-data memory section 32B.

Subsequently, the data communication section 33A of the information providing server 30 generates data of a mode selection screen which shows the contents of the acquired address data 320 and sends the generated data to the portable terminal 10 (step S111).

Upon reception of the data of the mode selection screen supplied from the information providing server 30, the display control section 15A of the portable terminal 10 controls the display section 12 to display the mode selection screen (step S112).

As shown in FIG. 6C, the mode selection screen shows print modes of the printer 20 placed in the shop selected by the user. The mode selection screen is provided with selection buttons 521 that indicate e-mail addresses assigned to the respective print modes.

The user selects a desired print mode from among the displayed print modes by clicking one of the selection buttons 521 by operating the input section 11 of the portable terminal 10.

In response to clicking made by the user, the mail transmission/reception section 15B of the portable terminal 10 activates e-mail software. Then, the mail transmission/reception section 15B controls the display section 12 to display an e-mail transmission screen (step S113).

Figure 6D:
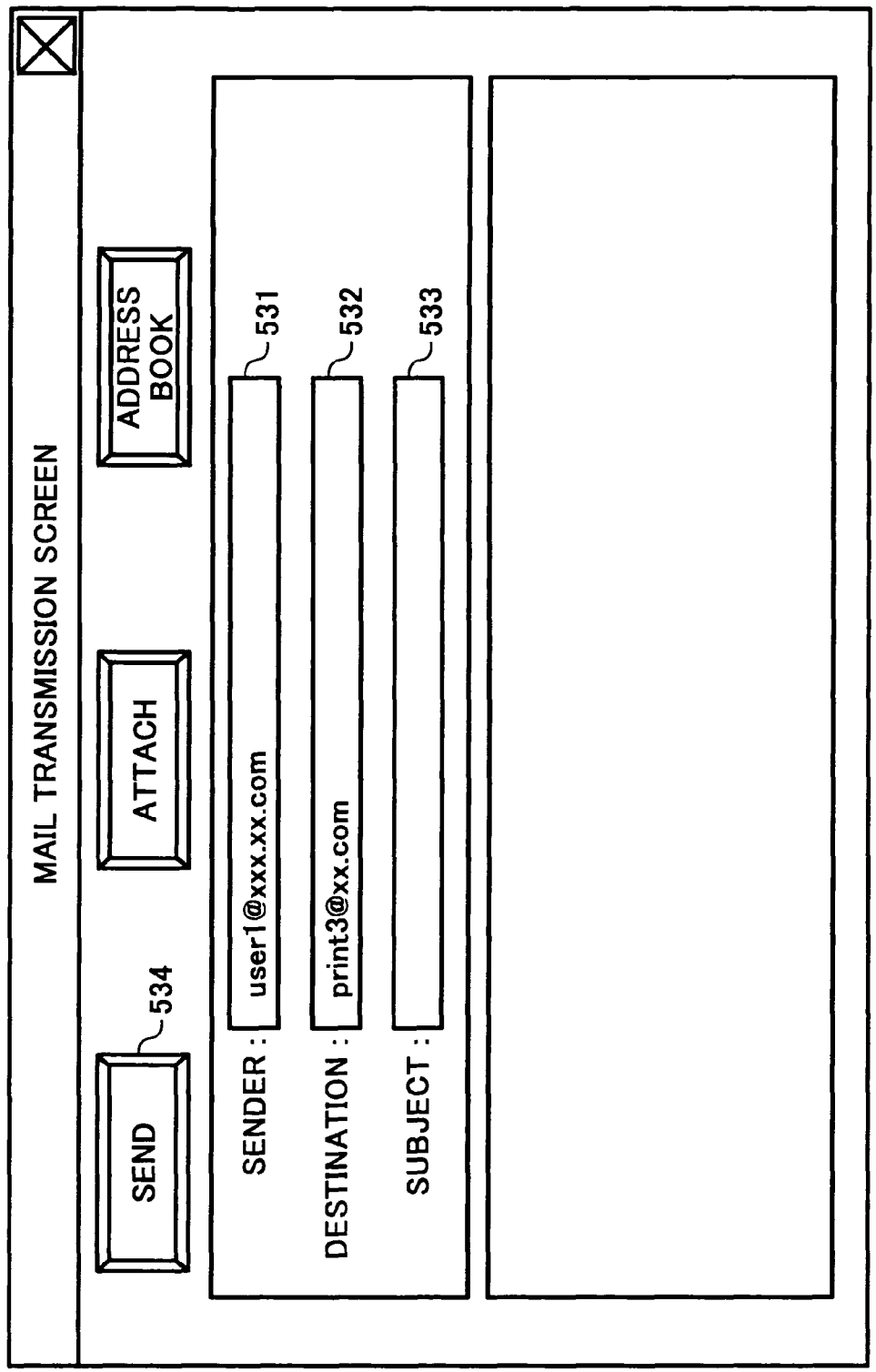
FIGS. 6D and 6E are diagrams showing mail transmission screens displayed by the portable terminal.

At this time, the mail transmission/reception section 15B inputs the e-mail address (sender address) of the user and an e-mail address indicating the destination of an e-mail (receiver address) in predetermined spaces 531 and 532 as shown in FIG. 6D.

The "receiver address" is an e-mail address assigned to a print mode selected on the mode selection screen by the user. In case where the user has selected "monochromatic printing, one-side printing" on the mode selection screen exemplified in FIG. 6C, for example, "print3@xx.com" is input in the space 532.

The e-mail transmission screen is provided with space 533 where a subject is to be input and a Send button 534 for sending an email.

Figure 6E:
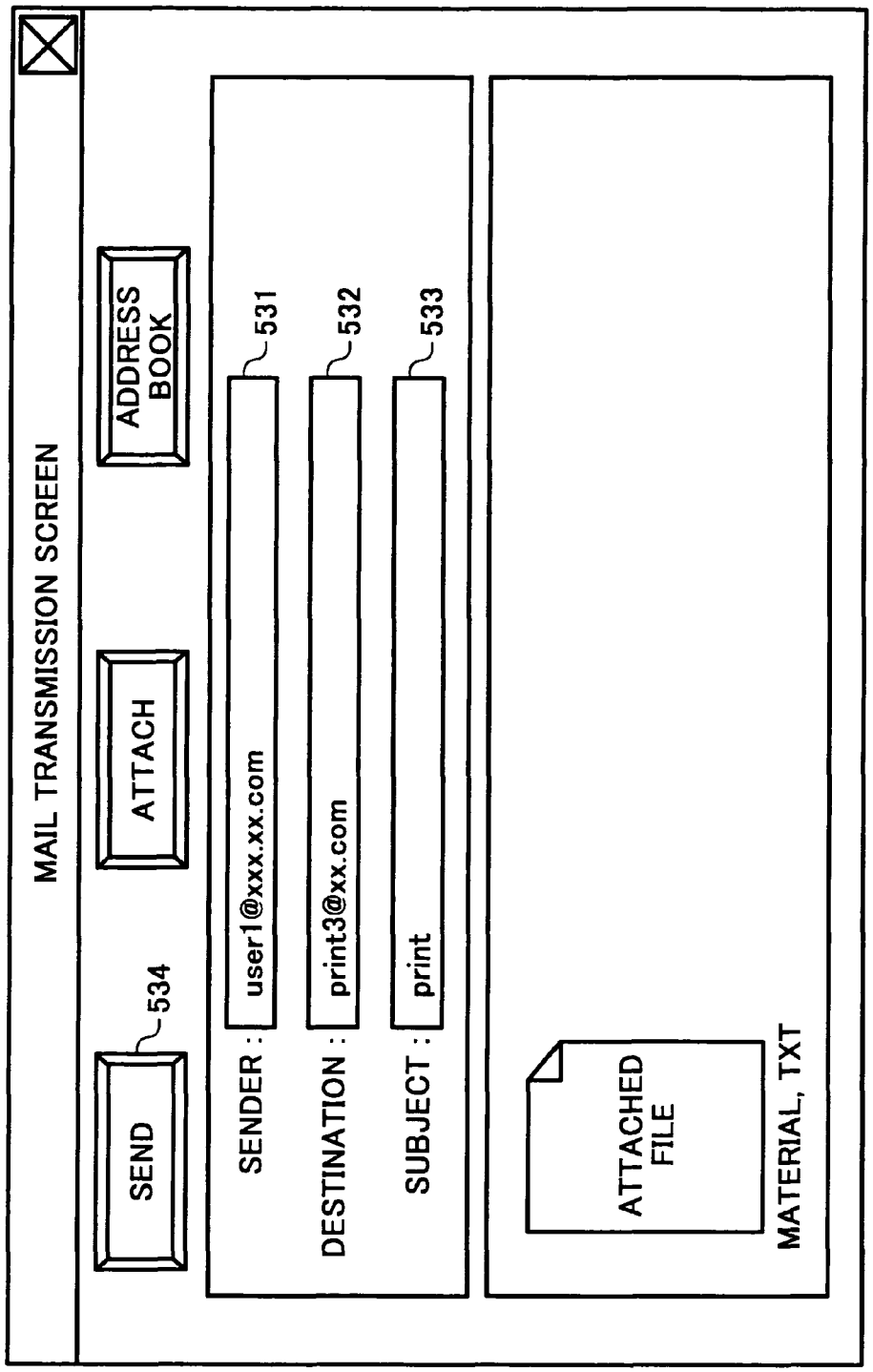

As shown in FIG. 6E, the user inputs a predetermined sequence of characters (e.g., "print") indicating a request for printing in the subject space 533 by operating the input section 11 of the portable terminal 10. Next, the user attaches a file to be printed by operating the input section 11.

In the example given in FIG. 6E, an extension "txt" is affixed to the file name of the attached file.

Then, the user clicks the Send button 534 provided on the e-mail transmission screen by operating the input section 11.

In response to clicking made by the user, the mail transmission/reception section 15B of the portable terminal 10 sends an e-mail with the attached file (step S114).

The mail transmission/reception section 24A of the printer 20 that has received the e-mail from the portable terminal 10 discriminates from the subject "print" of the received e-mail that the received e-mail is requesting printing. Then, the mail transmission/reception section 24A associates pieces of data on the sender address, receiver address, attached file and the extension included in the received e-mail with one another and stores them as request data 210 in the request-data memory section 23A (step S115).

Subsequently, the charge calculation section 24B of the printer 20 calculates a charge for printing requested by the user and adds the charge to the request data 210 stored in step S115 (step S116).

Specifically, based on the extension included in the request data 210 stored in step S115, the charge calculation section 24B specifies an application program which has been used to create the attached file, i.e., an application program which is to be used to create print data. The charge calculation section 24B also specifies the print mode selected by the user, by using the receiver address in the request data 210 stored in step S115 and the condition data 220 in the condition-data memory section 23B. Further, the charge calculation section 24B acquires the volume of the attached file included in the request data 210 stored in step S115. Then, the charge calculation section 24B acquires a unit charge associated with the specified application program and print mode from the charge data 230 in the charge-data memory section 23C. The charge calculation section 24B then acquires a charge by multiplying the acquired unit charge by the volume of the attached file and adds the charge to the request data 210.

The mail transmission/reception section 24A of the printer 20 generates data of a confirmation mail indicating the charge obtained by the charge calculation section 24B and sends the generated data to the requester's portable terminal 10 (step S117).

Upon reception of the data of the confirmation mail supplied from the printer 20, the mail transmission/reception section 15B of the portable terminal 10 controls the display section 12 to display the confirmation mail (step S118).

The confirmation mail shows the location of the shop where the printer 20 selected by the user is placed, the charge for printing, etc., as shown in FIG. 6F.

The user confirms the contents of the displayed confirmation mail. In case where the user requests for printing, the user clicks a Reply button 551 provided in the confirmation mail by operating the input section 11.

In response to clicking made by the user, the mail transmission/reception section 15B returns the confirmation mail to the printer 20 (step S119). This completes the request for printing made to the printer 20 by the user.

In case where the confirmation mail is not returned within a predetermined time, the mail transmission/reception section 24A of the printer 20 discriminates that a request for printing has been canceled. In that case, the mail transmission/reception section 24A deletes the request data 210 for which no reply has been made from the request-data memory section 23A.

(Execution of Printing)

An operation in case printing requested by the user is executed will be discussed.

In case of executing printing, the user displays the confirmation mail shown in FIG. 6F again on the display section 12 by operating the input section 11.

The mail transmission/reception section 15B controls the display section 12 in accordance with the user's operation and displays the confirmation mail shown in FIG. 6F again (step S120).

Then, the user clicks the Reply button 551 by operating the input section 11.

In response to clicking made by the user, the mail transmission/reception section 15B sends the confirmation mail in FIG. 6F back to the printer 20 again (step S121). This instructs the printer 20 to execute printing.

When the confirmation mail is sent back, the print control section 24C of the printer 20 acquires the request data 210 of the user who has instructed the execution of printing from the request-data memory section 23A by using the sender address included in the returned confirmation mail (step S122).

Subsequently, the print control section 24C specifies an application program for generating print data from the extension included in the acquired request data 210 (step S123).

Then, the print control section 24C activates the specified application program and generates print data for printing the attached file (step S124).

Thereafter, the print control section 24C controls the printing section 22 to execute printing the attached file by using the generated print data (step S125). As a result, the contents of the attached file (text, an image and/or a figure or the like) are printed on paper.

Meantime, after sending the confirmation mail back, the user pays the charge at the selected shop and receives the print.

The use of this printing system can allow a user even out of an office, for example, can execute printing a file by using the portable terminal.

As described above, a request for printing is made via an email. This makes it unnecessary to provide the printer 20 near the portable terminal 10. In other words, even if the current location of the user is remote from a desired location where the user wants to make a print, printing can be executed easily.

If multiple printers 20 are provided at multiple locations, the user can easily execute printing a file anytime and anywhere.

The capability of executing printing anytime and anywhere can allow the user to easily confirm the contents of a file on paper even if the contents of the file cannot be confirmed sufficiently on the small screen of the portable terminal 10.

The printer 20 specifies the application program that has created the attached file and generates print data using the specified application program. This eliminates the need for the portable terminal 10 to have the application program that has created the attached file. That is, the user can print a file by using even the portable terminal 10 which has a small memory capacity.

Printing is executed as the user sends a confirmation mail back again. This can prevent erroneous execution of printing, thus preventing wasteful use of paper.

The user can send a confirmation mail back at the user's convenience. In other words, the user can adjust the timing of executing printing at the user's convenience. For example, the user can instruct the execution of printing immediately before going to the selected shop. Accordingly, the user can avoid waiting for printing to end unnecessarily.

A single e-mail address is assigned to each print mode of the printer 20. This can allow the user to easily change the print mode by changing the destination of an e-mail.

Second Embodiment

A printing system according to the second embodiment of the invention will be described below with reference to the accompanying drawings.

The following description of the second embodiment will be given of the case where a user operates a printer to download an e-mail from a mail server and make printing.

Figure 7:
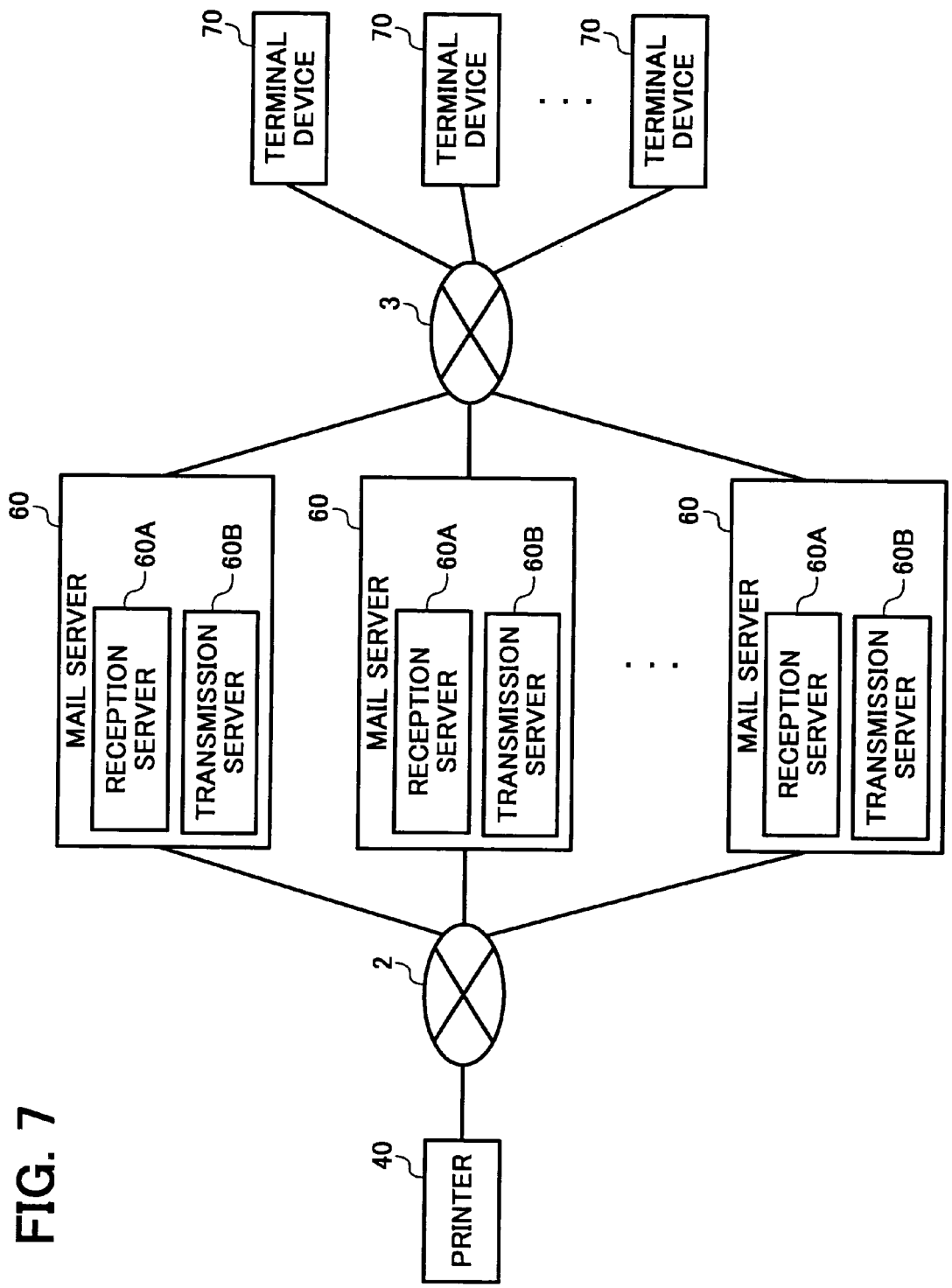
FIG. 7 is a structural diagram of a printing system according to a second embodiment.

As shown in FIG. 7, the printing system according to the second embodiment comprises a public telephone network 2, an Internet 3, a printer 40, a plurality of mail servers 60 and a plurality of terminal devices 70.

The printer 40 is sited in a company or public facility. The printer 40 is a multi-function printer (MFP) equipped with a printer capability, copy capability, facsimile capability and so forth.

The printer 40 is connected to the mail servers 60 via the public telephone network 2. The printer 40 downloads an e-mail addressed to a user from a predetermined mail server 60 and prints the e-mail.

Each mail server 60 is managed by an Internet provider or the like. Each mail server 60 is connected over the Internet 3 to the plural terminal devices 70, such as a work station, a personal computer and a portable telephone.

Each mail server 60 comprises a reception server 60A which exclusively receives e-mails and a transmission server 60B which exclusively sends e-mails and intervenes transmission and reception of e-mails that are carried out among the terminal devices 70.

An e-mail that has been sent by the user using a terminal device 70 is transmitted, via the transmission server 60B of the mail server 60 that is managed by the provider with whom the user has made a contract, to the reception server 60A of a mail server 60 which is managed by a provider with whom a user at the transmission destination has made a contract. The reception server 60A that has received the e-mail stores the received e-mail in a predetermined mail box. In case where the user acquires an e-mail via a terminal device 70, the user operates the terminal device 70 to access the mail server 60 for which the user has made a contract and download e-mails addressed to the user stored in the predetermined mail box.

Transmission and reception of e-mails are executed via the plural mail servers 60 in this manner.

The detailed structure of the printer 40 will be discussed below.

Figure 8:
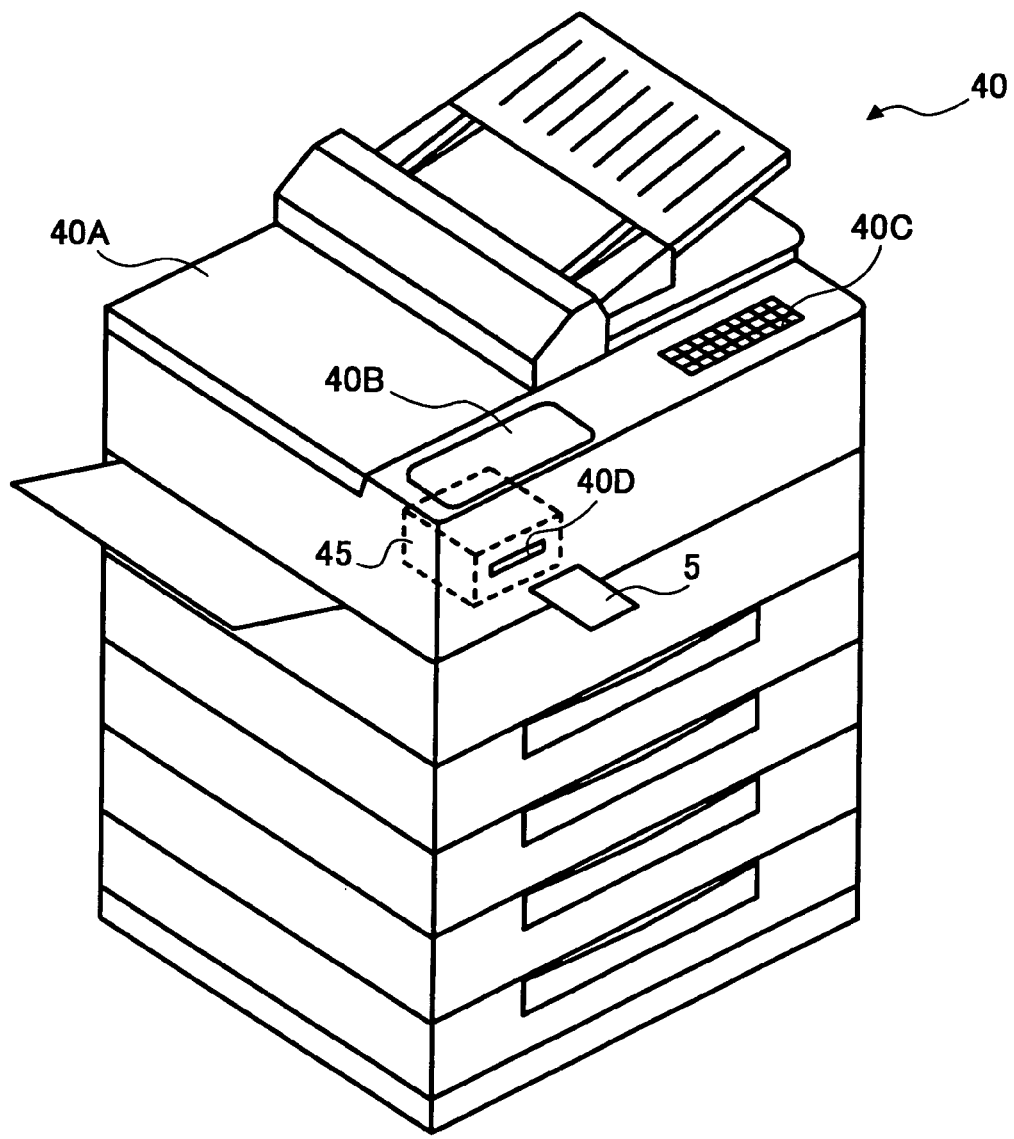
FIG. 8 is an outside diagram of a printer which constitutes the printing system in FIG. 7.

As shown in FIG. 8, an openable cover 40A is provided at the top portion of the body of the printer 40. A display panel 40B and a plurality of operation buttons 40C are provided adjacent to the cover 40A.

The display panel 40B is comprised of a touch panel. The display panel 40B is provided to display various screens and to allow the user to input various instructions and data.

The plural operation buttons 40C are provided to allow the user to input various instructions and data.

A reading apparatus 45 having a card slot 40D is assembled in the side portion of the body of the printer 40. A memory card 5 owned by the user is inserted into the card slot 40D. The reading apparatus 45 reads data recorded on the inserted memory card 5.

Figures 9A, 9B:
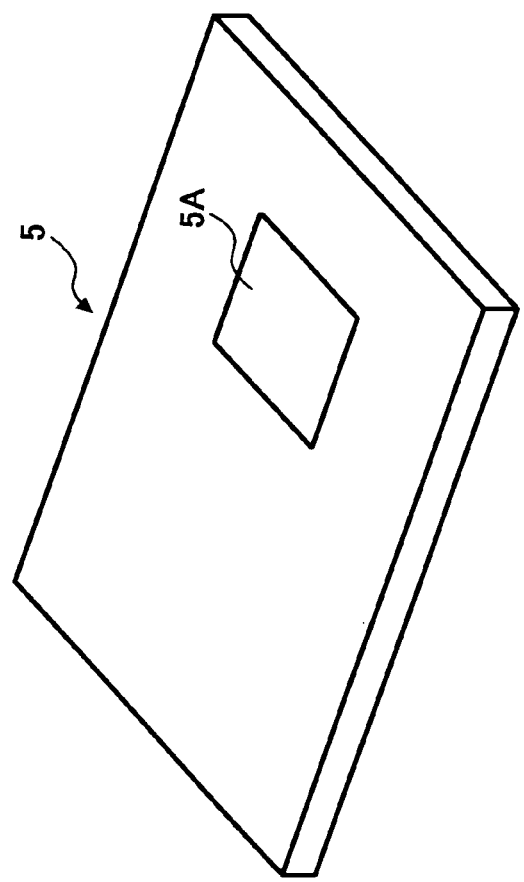
FIG. 9A is a structural diagram of a memory card to be inserted into the printer in FIG. 7
FIG. 9B is a diagram depicting data to be stored in the memory card in FIG. 9A.

The memory card 5 is a portable recording medium such as an IC card or a magnetic card. A memory section 5A is provided on the surface of the memory card 5 as shown in FIG. 9A. The memory section 5A is an IC chip when the memory card 5 is an IC card and a magnetic tape when the memory card 5 is a magnetic card. FIG. 9A shows an example of the memory card 5 as an IC card.

The memory section 5A stores at least data needed to download an e-mail addressed to the user from the mail server 60.

Data needed to download an e-mail, as shown in FIG. 9B, consists of data representing connection information for connecting the printer 40 to the mail server 60, a user ID, a password, an e-mail address and so forth. The connection information includes a telephone number for connecting the printer 40 to the mail server 60.

The internal structure of the printer 40 will be discussed below.

Figure 10B:
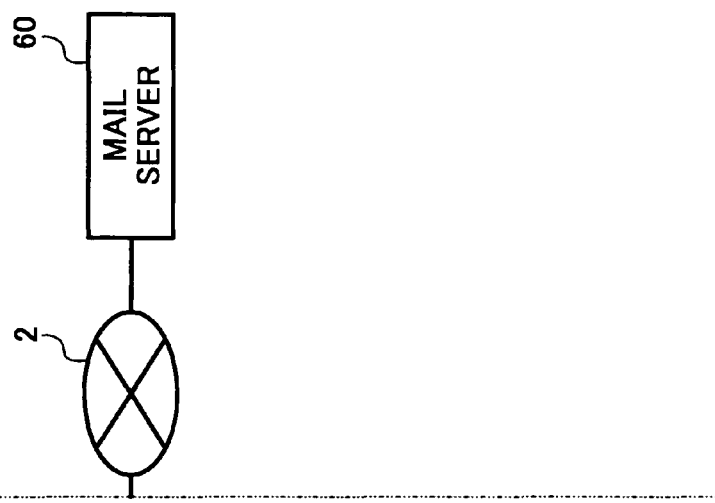
FIG. 10 is an internal structural diagram of the printer shown in FIG. 8.

As shown in FIG. 10, the printer 40 comprises a display section 41, an input section 42, a panel controller 43, an e-mail controller 44, the reading apparatus 45, an e-mail interface (I/F) 46, a scanner controller 47, a scanner 48, a facsimile controller 49, a facsimile I/F 50, a printer controller 51, a printer engine 52, a mail buffer 53 and a data buffer 54.

Figure 11A:
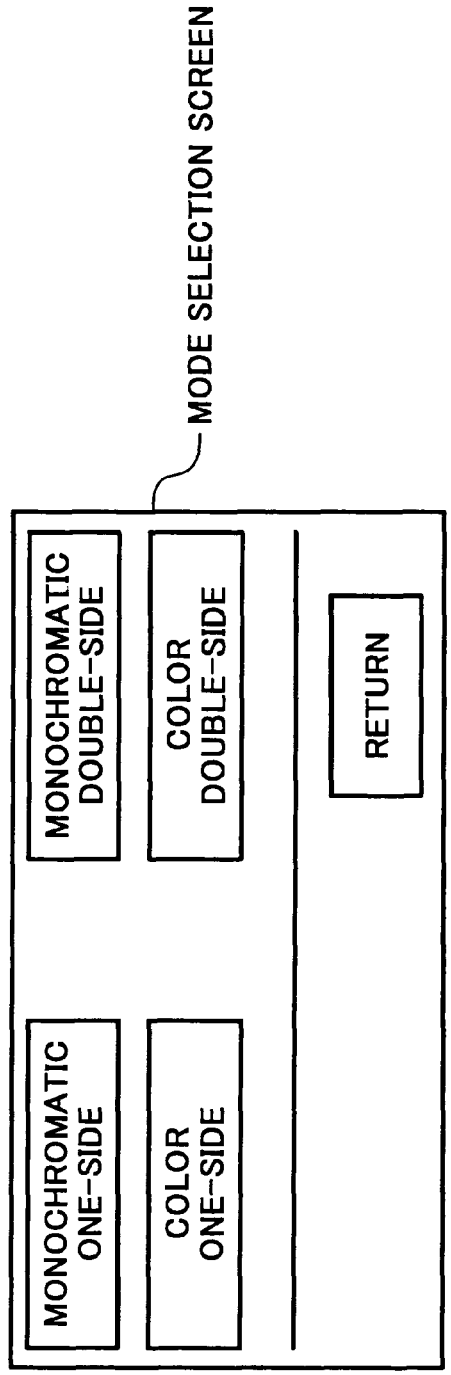
FIG. 11A is a diagram showing a mode selection screen displayed by the printer and FIG. 11B is a diagram showing an index screen displayed by the printer.
Figure 11B:
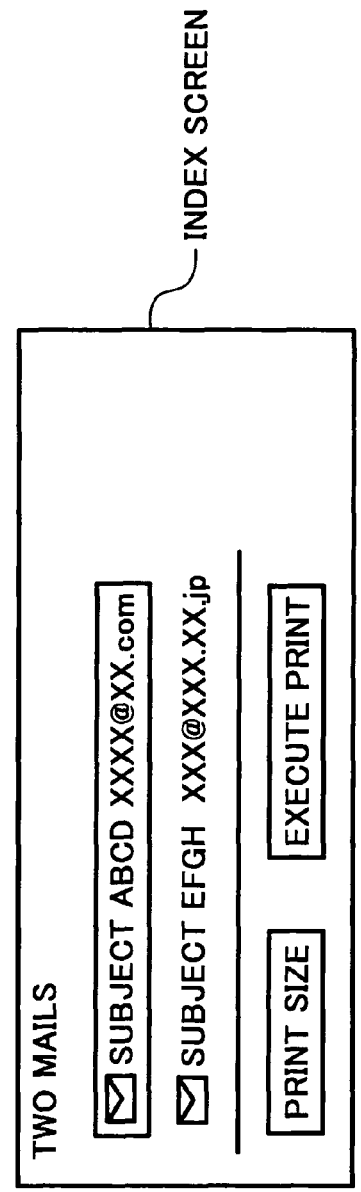

The display section 41 displays various screens by driving the display panel 40B using data supplied from the panel controller 43. For example, the display section 41 displays a mode selection screen for selecting print conditions (print modes) of the printer 40 as shown in FIG. 11A and an index screen, as shown in FIG. 11B, which shows indexes of e-mails downloaded from the mail server 60.

The input section 42 controls the display panel 40B to detect a position on the display panel 40B which has been touched by the user. The input section 42 outputs an input signal corresponding to the detected position to the panel controller 43. The input section 42 controls the plural operation buttons 40C and sends an input signal corresponding to any operation button 40C depressed by the user to the panel controller 43.

For example, the input section 42 outputs the panel controller 43 a mode select signal indicating the print mode selected by the user, a copy start signal instructing the initiation of copying and a FAX transmission signal instructing facsimile transmission. Further, the input section 42 outputs a mail select signal indicating an e-mail selected on the index screen by the user to the panel controller 43.

The panel controller 43 displays various screens by supplying the display section 41 with data of screens to be displayed on the display panel 40B. For example, the panel controller 43 supplies the display section 41 with data of the mode selection screen, index screen, etc. to display the associated mode selection screen, index screen and so forth.

The panel controller 43 also supplies an input signal supplied from the input section 42 to other controllers. For example, the panel controller 43 supplies the mode select signal to the printer controller 51, the copy start signal and FAX transmission signal to the scanner controller 47 and the mail select signal to the e-mail controller 44, respectively.

The e-mail controller 44 manages e-mail related operations which are executed by the printer 40. The e-mail controller 44 has an index generating section 44A, a mail identifying section 44B and a print instructing section 44C.

The index generating section 44A accesses the mail server 60 for which the user has made a contract by using data read from the memory card 5 by the reading apparatus 45. The index generating section 44A downloads e-mails addressed to the user from the accessed mail server 60 and stores them in the mail buffer 53.

The index generating section 44A generates data of the index screen which shows the index of an "unopened" e-mail in those e-mails downloaded. The index generating section 44A then sends the generated data of the index screen to the panel controller 43.

At the time the index generating section 44A downloads an e-mail, communication between the printer 40 and the mail server 60 is controlled by the e-mail I/F 46. The e-mail I/F 46 has a communication device (communication board) and communication software, and controls communication in accordance with a communication protocol for e-mails.

The mail identifying section 44B discriminates whether each e-mail downloaded is "opened" or "unopened". The mail identifying section 44B extracts data of an e-mail which has been discriminated as "unopened" from the mail buffer 53. The index generating section 44A generates data of the index screen showing the index of the email extracted by the mail identifying section 44B.

The print instructing section 44C instructs the printer controller 51 to print the e-mail selected on the index screen by the user in response to the mail select signal supplied from the panel controller 43.

The scanner controller 47 drives the scanner 48 in response to the copy start signal and FAX transmission signal supplied from the panel controller 43. Then, the scanner controller 47 converts data of an image (RGB image data) scanned by the scanner 48 to data of a predetermined format and outputs the converted data to other controllers.

In case where the printer 40 is set to the copy mode, for example, i.e., when the copy start signal is supplied, the scanner controller 47 converts data of the scanned image to print data and outputs the print data to the printer controller 51. In case where the printer 40 is set to the facsimile mode, i.e., when the FAX transmission signal is supplied, the scanner controller 47 converts data of the scanned image to facsimile data and outputs the facsimile data to the facsimile controller 49.

The facsimile controller 49 manages facsimile related operations which are executed by the printer 40. The facsimile controller 49 sends or receives facsimile data over the public telephone network 2. When receiving facsimile data, the facsimile controller 49 converts the received facsimile data to print data and sends the print data to the printer controller 51.

The printer controller 51 controls the printer engine 52 to execute printing by using supplied print data or the like.

The mail buffer 53 is comprised of a memory for storing data of e-mails. Data of an e-mail downloaded by the e-mail controller 44 is temporarily stored in the mail buffer 53.

The data buffer 54 is comprised of a plurality of memories and stores data, such as image data scanned by the scanner 48, facsimile data and print data.

Each of the panel controller 43, the e-mail controller 44, the scanner controller 47, the facsimile controller 49 and the printer controller 51 comprises a CPU and a memory.

Each memory stores a program for realizing the function of the associated controller. As each CPU executes the program in the associated memory, the function of the associated controller is realized.

For example, the memory that constitutes the e-mail controller 44 stores e-mail software. As the CPU that constitutes the e-mail controller 44 executes the program in that memory, the index generating section 44A, the mail identifying section 44B and the print instructing section 44C are realized.

A description will now be given of how the printing system according to the second embodiment prints an e-mail.

Figure 12:
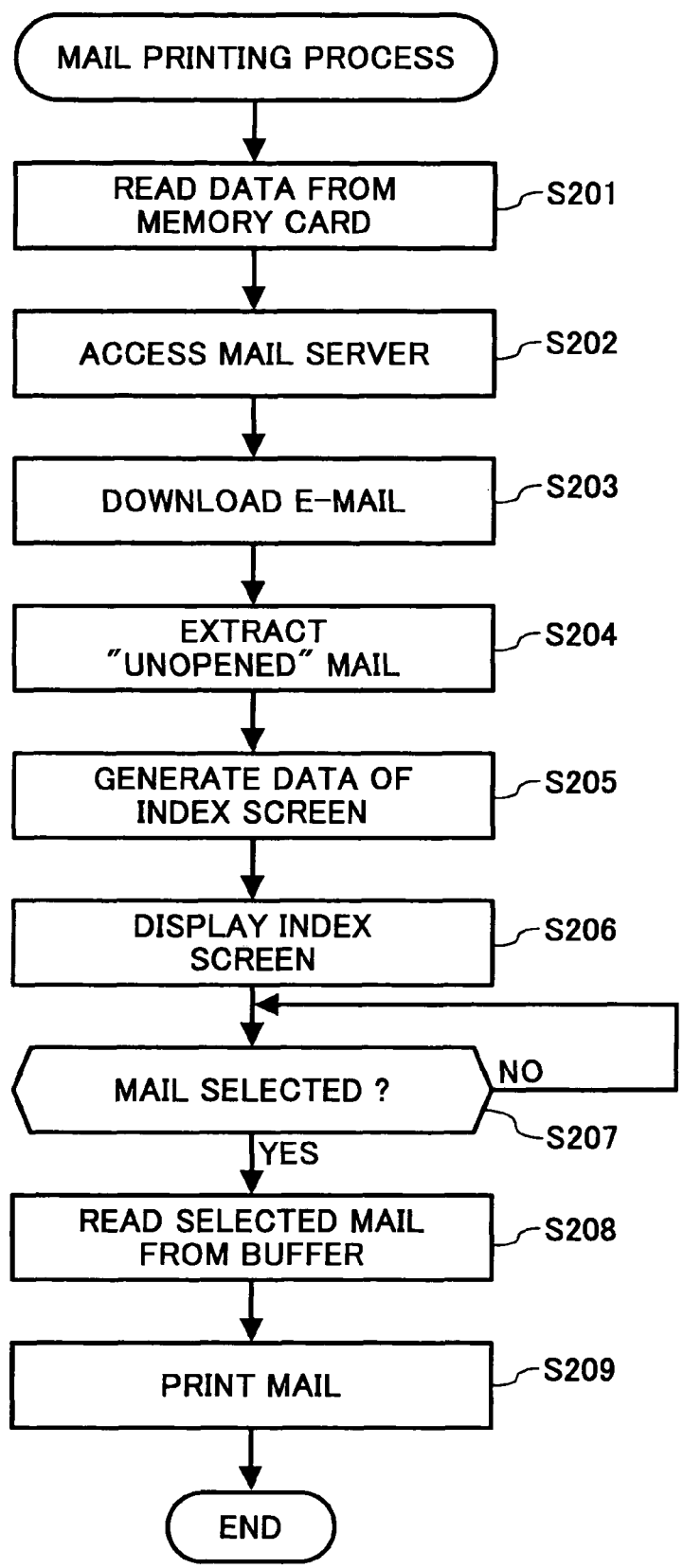
FIG. 12 is a flowchart illustrating a mail printing process which is performed by the printer.

FIG. 12 is a flowchart illustrating a mail printing process which is performed by the printer 40.

First, the user inserts his or her own memory card 5 into the card slot 40D of the printer 40.

As the memory card 5 is inserted into the card slot 40D, the reading apparatus 45 reads data (connection information, user ID, password, e-mail address, etc.) stored in the memory section 5A of the memory card 5. Then, the reading apparatus 45 sends the read data to the e-mail controller 44 (step S201).

In response to the data supplied from the reading apparatus 45, the index generating section 44A of the e-mail controller 44 accesses the mail server 60 that is managed by the provider with whom the user has made a contract, by using the supplied data (step S202).

Subsequently, the index generating section 44A downloads emails addressed to the user from the accessed mail server 60 by using the supplied data and stores the e-mails in the mail buffer 53 (step S203).

The mail identifying section 44B of the e-mail controller 44 discriminates whether each e-mail stored in the mail buffer 53 is "opened" or "unopened". The mail identifying section 44B extracts data of an e-mail which has been discriminated as "unopened" from the mail buffer 53 and supplies the data to the index generating section 44A (step S204).

The index generating section 44A creates the index of each "unopened" e-mail using the supplied data. Next, the index generating section 44A generates data of the index screen that shows the created indexes and outputs the data to the panel controller 43 (step S205).

The panel controller 43 supplies the display section 41 with the data of the index screen supplied from the index generating section 44A thereby to display the index screen on the display panel 40B (step S206).

The user touches one of the indexes of e-mails shown on the index screen which the user wants to print.

The input section 42 detects the position on the index screen touched by the user. Then, the input section 42 sends a signal corresponding to the detected position, that is, the mail select signal designating an e-mail selected by the user to the panel controller 43. The panel controller 43 supplies the mail select signal supplied from the input section 42 to the e-mail controller 44.

After the index generating section 44A outputs data of the index screen in step S205, the print instructing section 44C of the email controller 44 discriminates whether or not the mail select signal has been supplied. Accordingly, the print instructing section 44C discriminates whether the user has selected an e-mail to be printed or not (step S207).

In case where it is discriminated that the mail select signal has not been supplied, i.e., in case where an e-mail to be printed has not been selected (NO in step S207), the flow returns to step S207.

In case where it is discriminated that the mail select signal has been supplied, i.e., in case where an e-mail to be printed has been selected (YES in step S207), the print instructing section 44C outputs a mail print signal instructing printing of the e-mail selected by the user to the printer controller 51. The printer controller 51 reads data of the e-mail selected by the user from the mail buffer 53 in response to the mail print signal supplied from the print instructing section 44C (step S208).

Then, the printer controller 51 drives the printer engine 52 to execute printing using the read data (step S209).

As a result, the e-mail selected by the user is printed on paper. The user receives the printed e-mail and removes the memory card 5 from the printer 40.

After the memory card 5 is removed from the printer 40, the print instructing section 44C of the e-mail controller 44 erases data of the e-mails stored in the mail buffer 53 when a predetermined period of time passes. Accordingly, the print instructing section 44C prevents the contents of e-mails from being read by other persons.

Using this printing system, the user can read an e-mail addressed to the user even if the user does not carry around a portable terminal, such as a notebook type computer or a portable telephone.

The user can print an e-mail simply by inserting the memory card 5 into the printer 40 and selecting a desired e-mail to be printed. That is, the operation the user does to print an e-mail is very simple. This can allow even a user who is not familiar with the operation of a computer to easily read an e-mail.

If multiple printers having functions similar to those of the printer 40 are placed at multiple locations, the user can print and read an e-mail anytime and anywhere.

The printer 40 is occupied substantially by a single user until printing of an e-mail is completed since the insertion of the memory card 5 into the printer 40. This prevents the contents of e-mails from being read by other persons.

The printer 40 prints only an e-mail selected by the user, not every e-mail downloaded, so that wasteful printing can be avoided.

The printer 40 extracts an "unopened" e-mail and presents it to the user. In other words, the printer 40 does not presents the user with those e-mails that have already been read by the user. This can allow the user to efficiently select an e-mail to be printed.

Modifications

The printing systems according to the first and second embodiments can be modified in various forms. Some of the modifications will be illustrated below.

The printer 20 of the first embodiment may start printing in response to the confirmation mail returned in the step S119. This can permit printing to be completed before the user goes to the selected shop.

In this case, the print control section 24C prints the e-mail address of the user together with the contents of the file. The user presents his or her e-mail address to a shop clerk and receives a file which has already been printed. This way the user need not wait for the end of printing unnecessarily. Because returning the confirmation mail as done in step S120 is unnecessary, the number of communications between the portable terminal 10 and the printer 20 is reduced.

The printer 20 according to the first embodiment may issue a receipt number to the user and start printing upon entry of the receipt number.

Figure 13A:
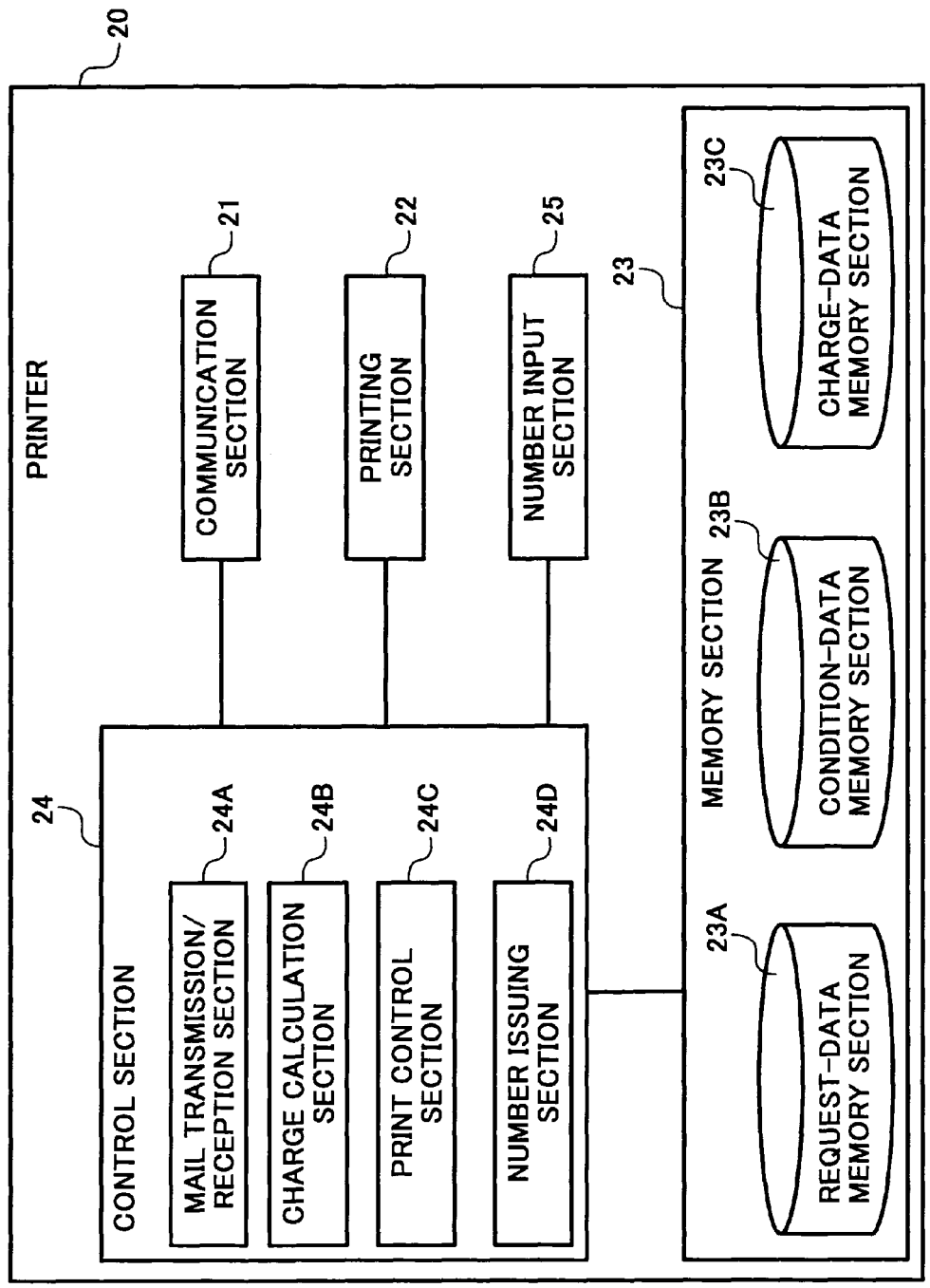
FIG. 13A is a diagram showing another structure of the printer according to the first embodiment and FIG. 13B is a diagram showing contents of a confirmation mail which is sent to a portable terminal by the printer in FIG. 13A.

In this case, the printer 20 further comprises a number issuing section 24D which issues a receipt number and a number input section 25 which is comprised of a plurality of input buttons, as shown in FIG. 13A.

The number issuing section 24D of the control section 24 issues a receipt number in response to an e-mail sent in the step S114. The number issuing section 24D adds the issued receipt number to the request data 210 stored in the request-data memory section 23A in step S115.

Figure 13B:
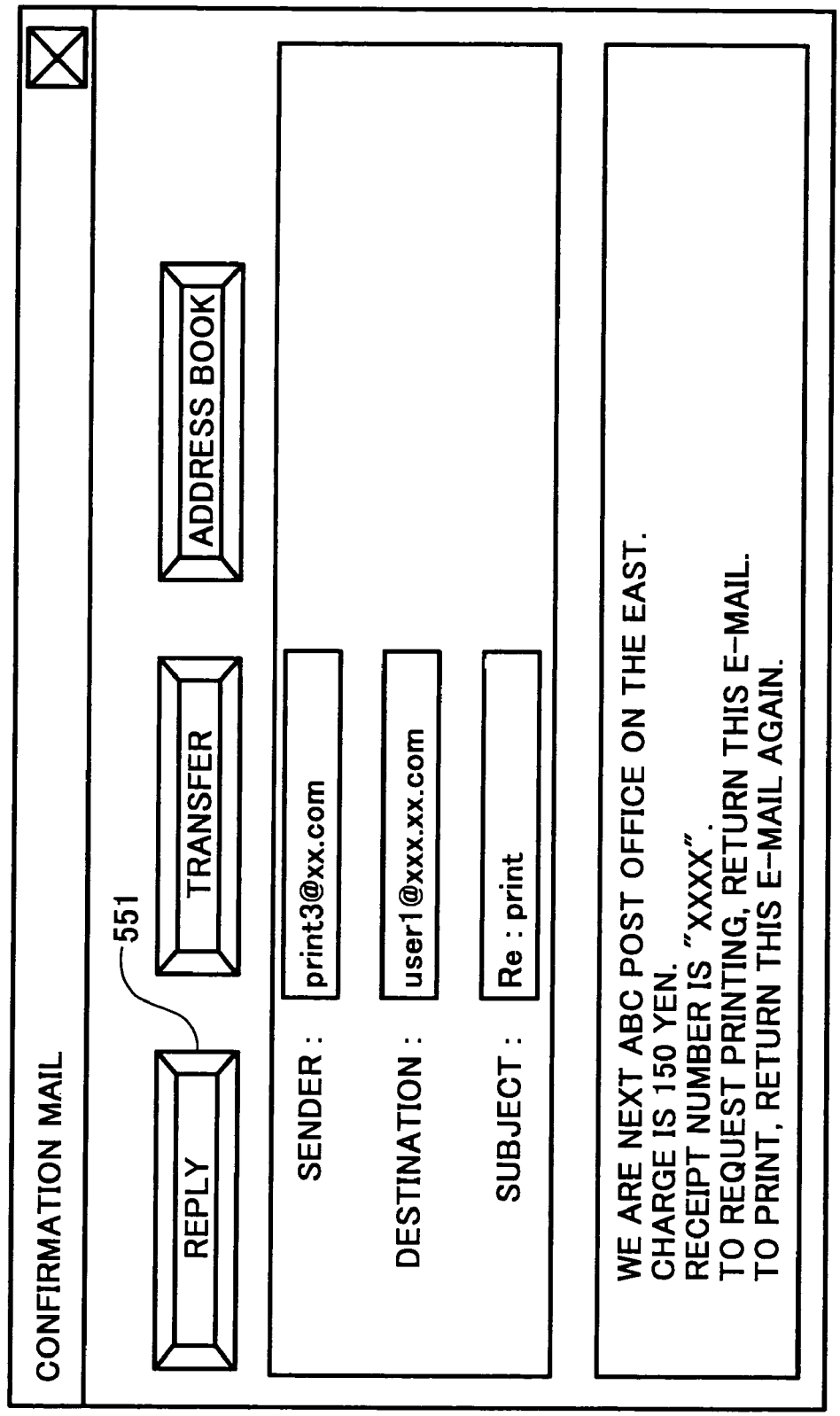

The mail transmission/reception section 24A generates data of a confirmation mail as shown in FIG. 13B and sends the data to the portable terminal 10 in the process of the step S117.

As shown in FIG. 13B, the confirmation mail shows the receipt number issued by the number issuing section 24D in addition to the location of a shop selected by the user and a charge for printing.

The user goes to the selected shop after receiving the confirmation mail. Then, the user input the receipt number by operating the number input section 25.

The number input section 25 outputs the receipt number of the user to the control section 24 in accordance with the user's operation.

In response to the supplied receipt number, the print control section 24C of the control section 24 acquires the request data 210 including the supplied receipt number from the request-data memory section 23A.

The subsequent processes are the same as those starting at step S123.

This modification makes it unnecessary for the user to return a confirmation mail, thereby reducing the number of communications between the portable terminal 10 and the printer 20.

The printer 20 according to the first embodiment may directly charge the user.

Figure 14:
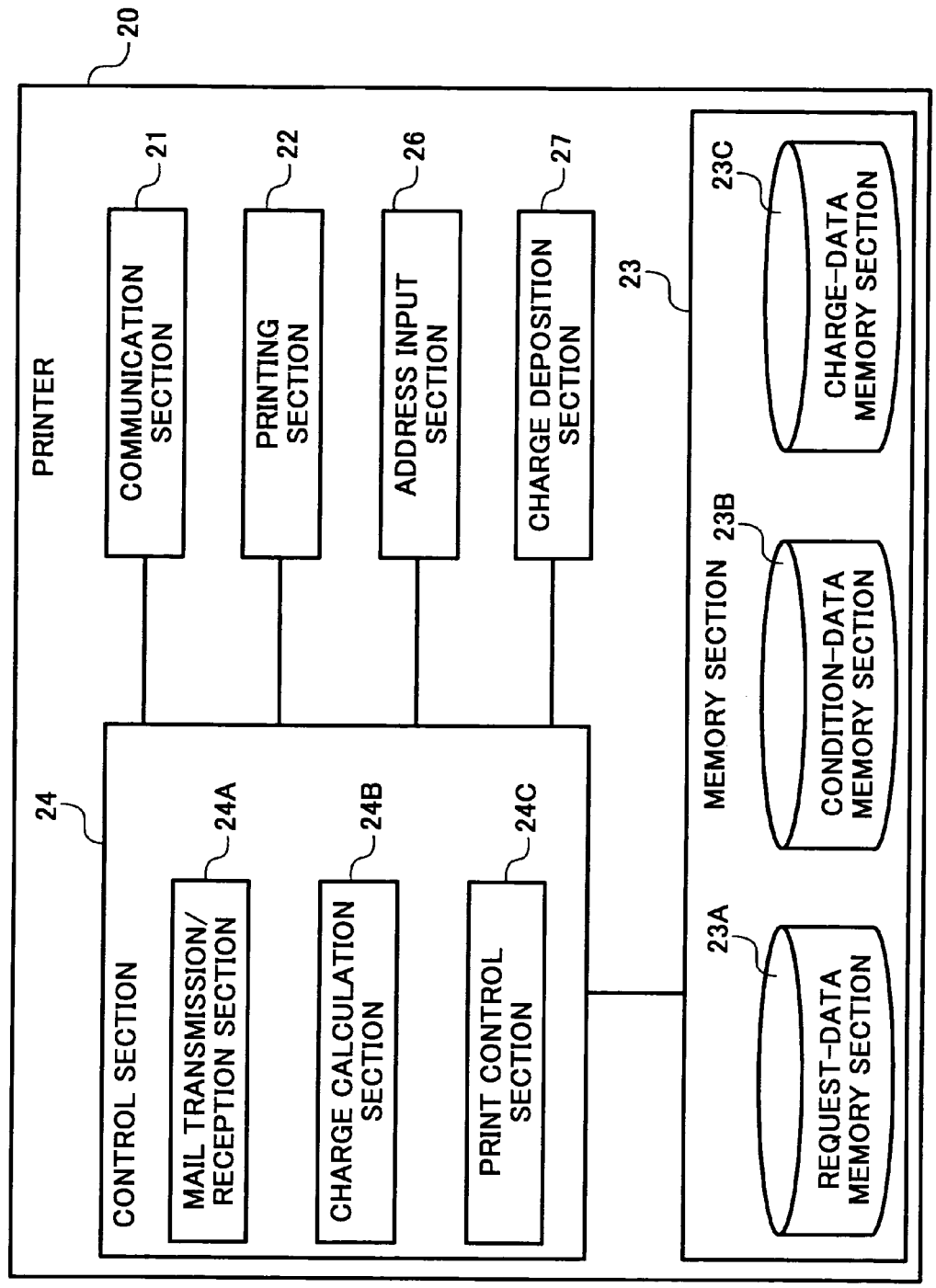
FIG. 14 is a diagram showing a different structure of the printer according to the first embodiment.

In this case, the printer 20 further has an address input section 26 and a charge deposition section 27, as shown in FIG. 14.

The address input section 26 has a plurality of input buttons to input an e-mail address. The address input section 26 inputs the e-mail address of the user to the control section 24 in accordance with the user's manipulation.

The charge deposition section 27 has a money slot to place coins and paper money, discriminates the amount of money deposited by the user and informs the control section 24 of the amount.

After confirming the place of the selected shop, a charge, etc. through the confirmation mail supplied from the printer 20, the user goes to the shop without returning the confirmation mail. Then, the user operates the address input section 26 of the printer 20 to input his or her e-mail address and places money for the informed charge in the charge deposition section 27.

The address input section 26 inputs the e-mail address of the user to the control section 24 in accordance with the user's manipulation.

The charge deposition section 27 discriminates the amount of money deposited by the user and informs the control section 24 of the discriminated amount.

The print control section 24C of the control section 24 acquires the request data 210 from the request-data memory section 23A using the e-mail address supplied from the address input section 26.

Then, the print control section 24C controls the printing section 22 to start printing when the amount informed by the charge deposition section 27 becomes equal to or greater than the amount indicated by the acquired request data 210.

This modification makes it unnecessary for the user to return a confirmation mail. This reduces the number of communications between the portable terminal 10 and the printer 20. Because the user can obtain a print without intervention of a shop clerk, it is possible to prevent the contents of a print from being read by other persons.

Figure 15:
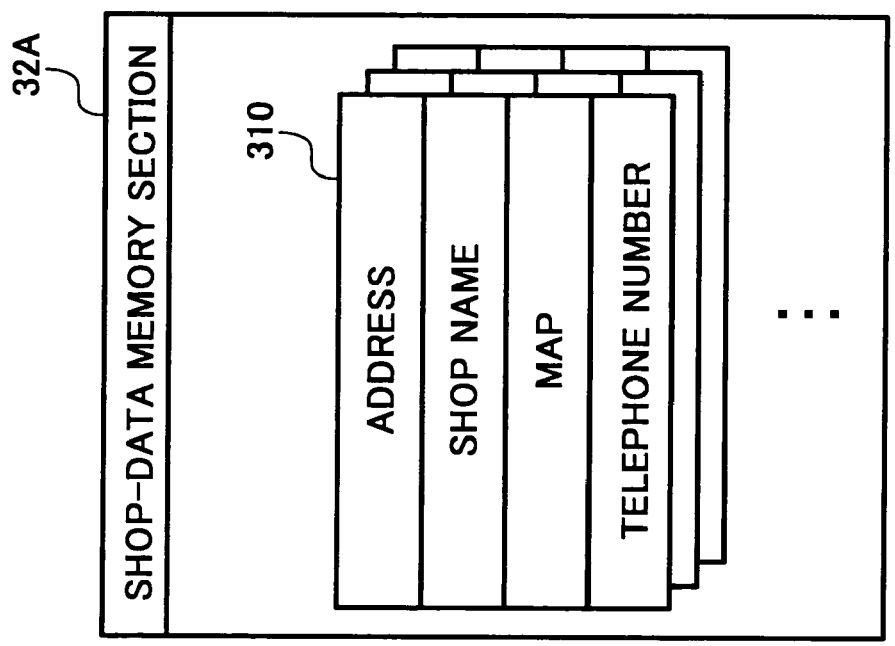
FIG. 15 is a diagram showing data to be stored in a shop-data memory section the printer in FIG. 14 has.

The information providing server 30 according to the first embodiment may further have data, such as maps indicating shops and the locations of the printers 20 and telephone numbers of the shops. Specifically, the shop data 310 to be stored in the shop-data memory section 32A may further include data, such as maps indicating shops and the locations of the printers 20 and telephone numbers of the shops, as shown in FIG. 15. This structure can provide the user with the locations of the printers 20 more specifically. The user can therefore grasp the locations of the printers more accurately.

In case where the user knows the e-mail address of a printer 20, the user may request the printer 20 to make a print without receiving information about the printer 20 from the information providing server 30. In this case, the processes from step S101 to S112 illustrated in FIGS. 5A and 5B are omitted.

The unit charge for printing that has mentioned in the foregoing description of the first embodiment may be other than a charge per 1 KBytes exemplified in FIG. 3C. For example, the unit charge may be a charge per 10 KBytes or per 100 KBytes or a charge per a sheet of paper to be used for printing.

The e-mail for instructing the execution of printing and the e-mail for requesting printing that have been mentioned in the foregoing description of the first embodiment may differ from each other. For example, the confirmation mail sent from the printer 40 may be used to request printing and an e-mail which has a predetermined sequence of characters (e.g., "GO") in a subject space may be used to instruct the execution of printing.

In this case, the user returns the confirmation mail in the step S119 and inputs a predetermined sequence of characters (e.g., "GO") in the subject space of the confirmation mail and sends the mail in the step S121.

With the design, when a communication failure or the like occurs, for example, printing will not be executed erroneously even if the mail server sends the same confirmation mail twice to the printer 20.

In the first embodiment, the charge calculation section 24B of the printer 20 may bill the user for charges over a predetermined period (e.g., in a day, a week or a month). In this case, the mail transmission/reception section 24A of the printer 20 request the user of information on the billed in order to specify where to bill for charges at the time of accepting a print request. The information on the billed includes, for example, the name, address and the bank account of the user and/or a credit card number or the like of the user. Then, the mail transmission/reception section 24A adds the information on the billed supplied from the user to the request data 210. The charge calculation section 24B calculates a total charge over a predetermined period user by user by using the request data 210. Then, the charge calculation section 24B bills each user for the charge using the information on the billed included in the request data 210. This design can ensure efficient collection of charges for printing.

The e-mail controller 44 of the printer 40 according to the second embodiment may further have a mail sending section 44D which sends a reply mail to a printed e-mail.

In this case, the memory card 5 or the mail buffer 53 has data of fixed statements for replies stored in advance. The fixed statements are statements generally used, such as "Acknowledged" and "Received".

The mail sending section 44D acquires data of a fixed statement from the mail buffer 53 in response to the user's operation. Alternatively, the mail sending section 44D acquires data of a fixed statement from data read by the reading apparatus 45.

The mail sending section 44D generates data of a statement list screen which shows a list of fixed statements by using the acquired data. The mail sending section 44D sends the generated data of the statement list screen to the panel controller 43 to display the statement list screen on the display panel 40B. Accordingly, the mail sending section 44D can allow the user to select a fixed statement to be used in the reply mail.

The user touches one of the fixed statements shown in the statement list screen which is used in the reply mail. This causes a statement select signal indicating the fixed statement selected by the user to be supplied to the mail sending section 44D via the input section 42 and the panel controller 43.

In response to the supplied statement select signal, the mail sending section 44D extracts data on the subject, the e-mail address of the sender and the e-mail address of the receiver from data of the printed e-mail.

The mail sending section 44D then creates a reply mail using the fixed statement indicated by the supplied statement select signal using the extracted data and sends out the reply mail.

This modification can allow the user to send the reply mail immediately after confirming the contents of the e-mail.

The printer 40 according to the second embodiment may download and print not only an e-mail but also a file which is created by the user using the terminal device 70 and represents a text, an image and/or a figure or the like.

Figure 17:
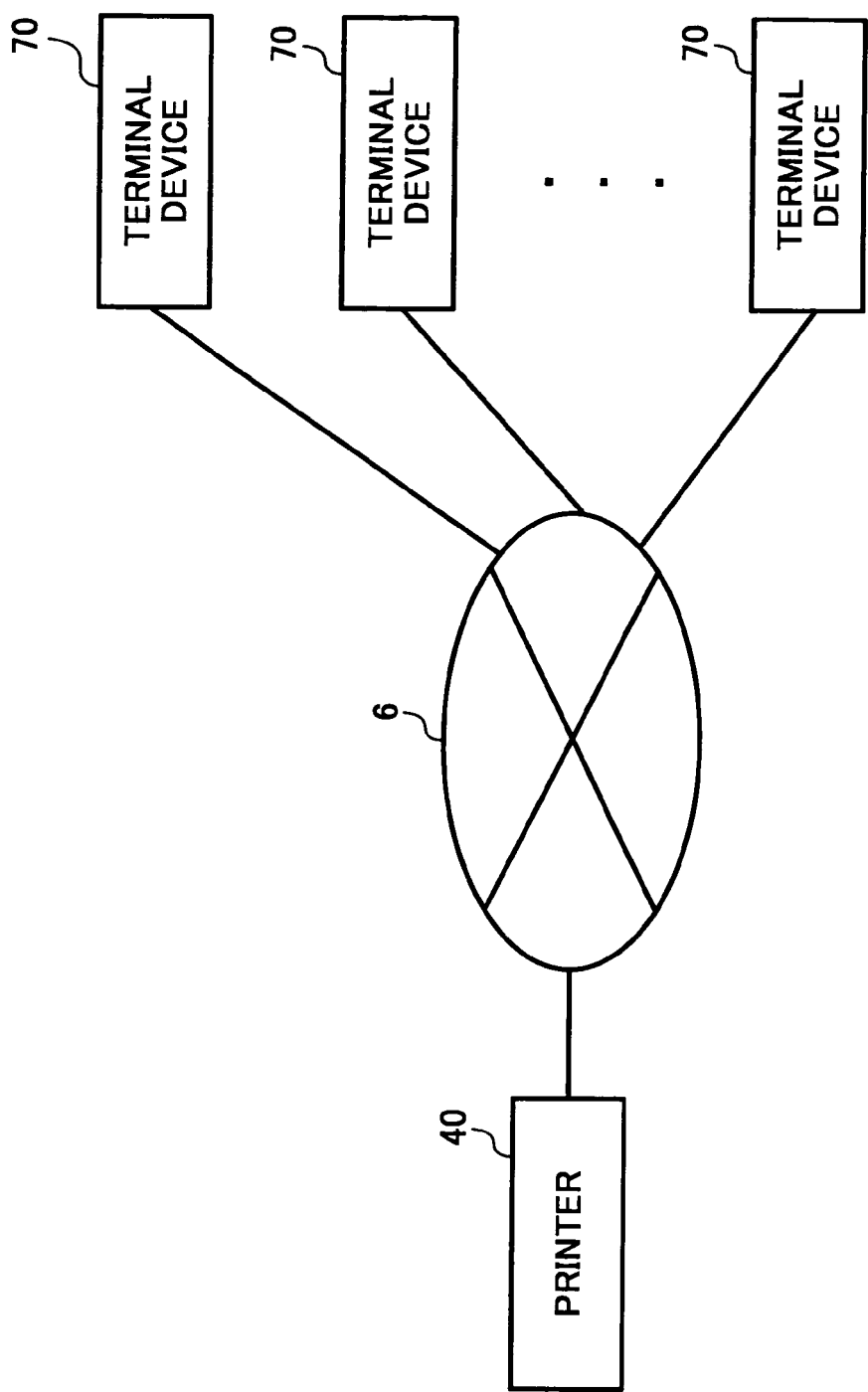
FIG. 17 is a diagram showing another structure of the printing system.

In this case, the printer 40 is connected to a plurality of terminal devices 70 via a network 6 which is constituted by a public telephone network and the Internet or the like, as shown in FIG. 17.

Figure 18A:
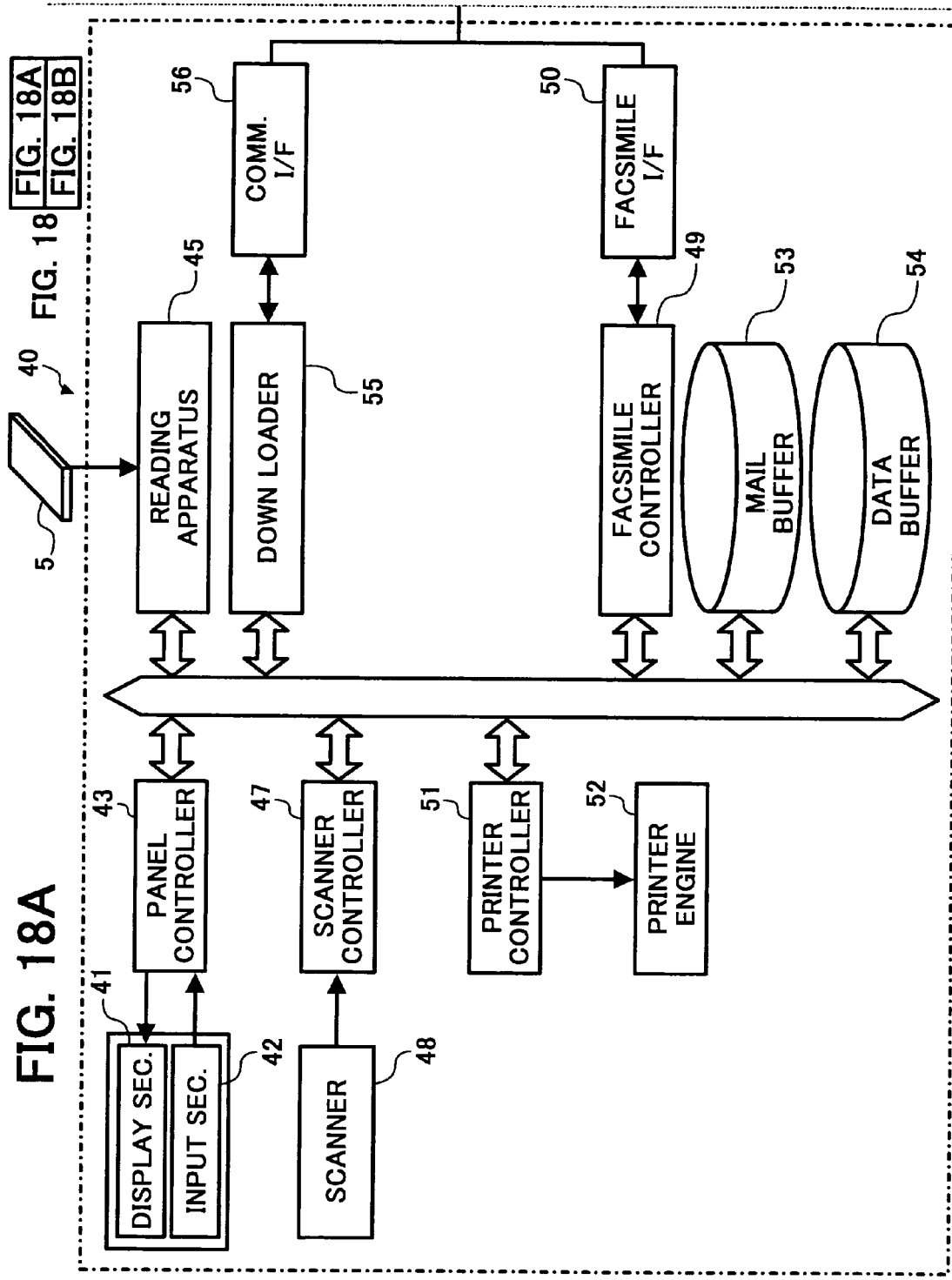
FIG. 18 is a structural diagram of a printer which constitutes the printing system in FIG. 17.
Figure 18B:
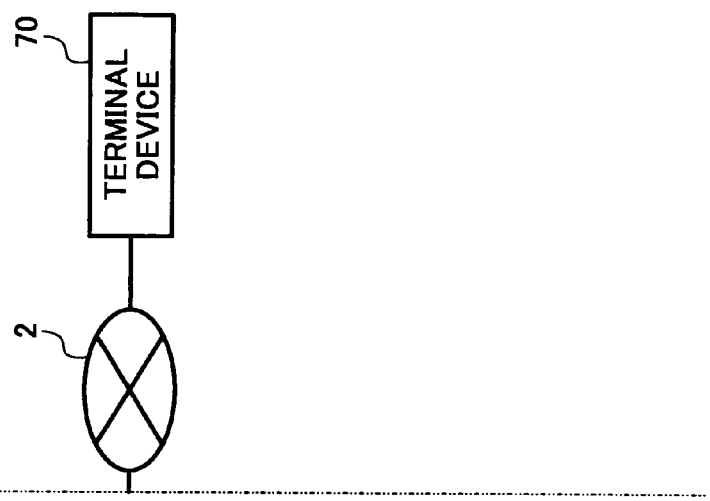

As shown in FIG. 18, the printer 40 has a downloader 55 which downloads files from the terminal devices 70 and a communication I/F 56 which controls communication between the printer 40 and the terminal devices 70, in place of the e-mail controller 44 and the e-mail I/F 46.

The printer controller 51 has a plurality of application programs for converting data of downloaded files to print data.

Each terminal device 70 stores files created by each user.

The memory section 5A of the memory card 5 owned by the user stores data necessary to download a file to be printed from each terminal device 70. The data needed to download a file consists of data which represents, for example, connection information (including a telephone number or URL (Uniform Resource Locator) or the like) for connection to each terminal device 70, the user ID and password the user has.

Figure 19:
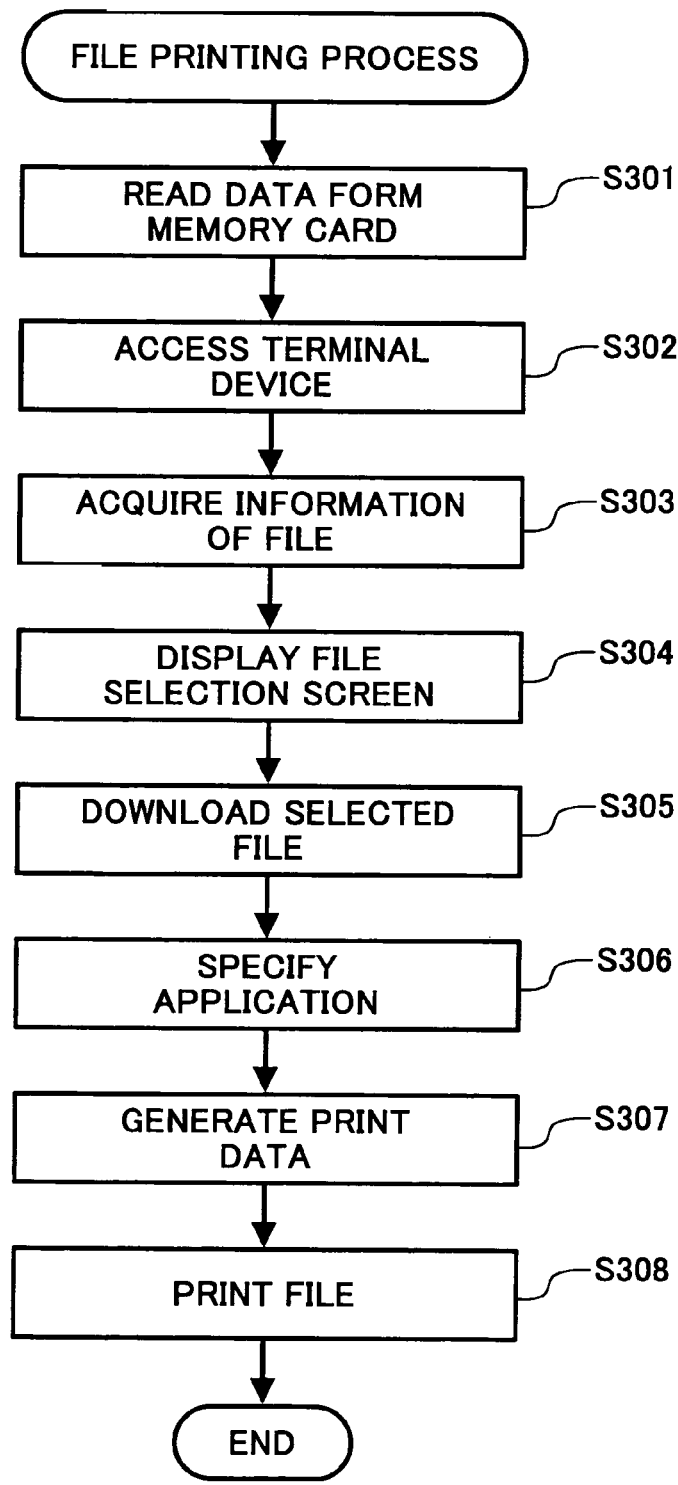
FIG. 19 is a flowchart illustrating a file printing process which is performed by the printer in FIG. 18.

FIG. 19 is a flowchart illustrating a file printing process which is performed by the printer 40.

When the user inserts the memory card 5 into the card slot 40D, the reading apparatus 45 reads data stored in the memory section 5A of the memory card 5 and outputs the data to the downloader 55 (step S301).

The downloader 55 accesses to the terminal device 70 which stores files created by the user by using the supplied data (step S302).

The downloader 55 acquires information of each file (a storage location, a file name, etc.) stored in the accessed terminal device 70 from the terminal device 70 (step S303).

Subsequently, the downloader 55 generates data of a file selection screen showing storage locations and names of files stored in the terminal device 70 using the acquired information and sends the data to the panel controller 43. Accordingly, the downloader 55 displays the file selection screen on the display panel 40B (step S304).

Figure 20:
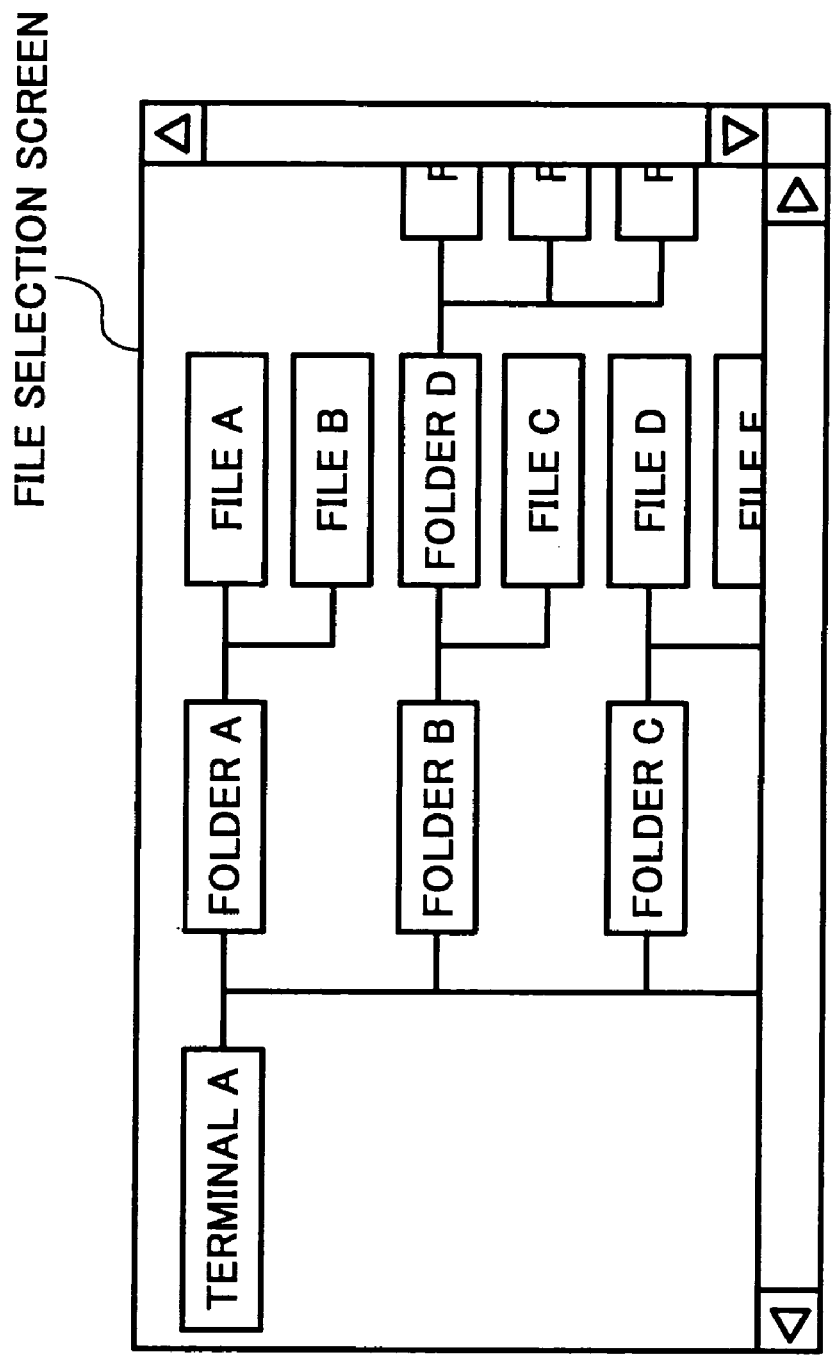
FIG. 20 is a diagram showing a file selection screen displayed by the printer in FIG. 18.

The file selection screen shows the names of files stored in the terminal device 70 in a tree form, as shown in FIG. 20.

The user touches the name of a desired file to be printed selected from file names shown on the file selection screen. This causes a file select signal designating the file selected by the user to be supplied to the downloader 55 via the input section 42 and the panel controller 43.

In response to the supplied file select signal, the downloader 55 downloads the file indicated by the file select signal and outputs the file to the printer controller 51 (step S305).

The printer controller 51 specifies an application program which has been used to create the file, i.e., the application program that is used in creating print data from the extension attached to the name of the supplied file (step S306).

Then, the printer controller 51 activates the specified application program and generates print data for printing the file (step S307).

Thereafter, the printer controller 51 controls the printer engine 52 and prints the file using the generated print data (step S308).

This design can allow the user to execute printing of a file without carrying around a portable terminal, such as a notebook type computer or a portable telephone.

If multiple printers having functions similar to those of the printer 40 are placed at multiple locations, the user can easily print and read an e-mail anytime and anywhere.

The print instructing section 44C of the printer 40 according to the second embodiment may be designed to delete from the mail buffer 53 those e-mails when a predetermined period of time has passed since the memory card 5 is removed from the printer 40.

The second embodiment may be modified in such a way that the user can instruct deletion of an e-mail stored in the mail buffer 53.

Figure 21:
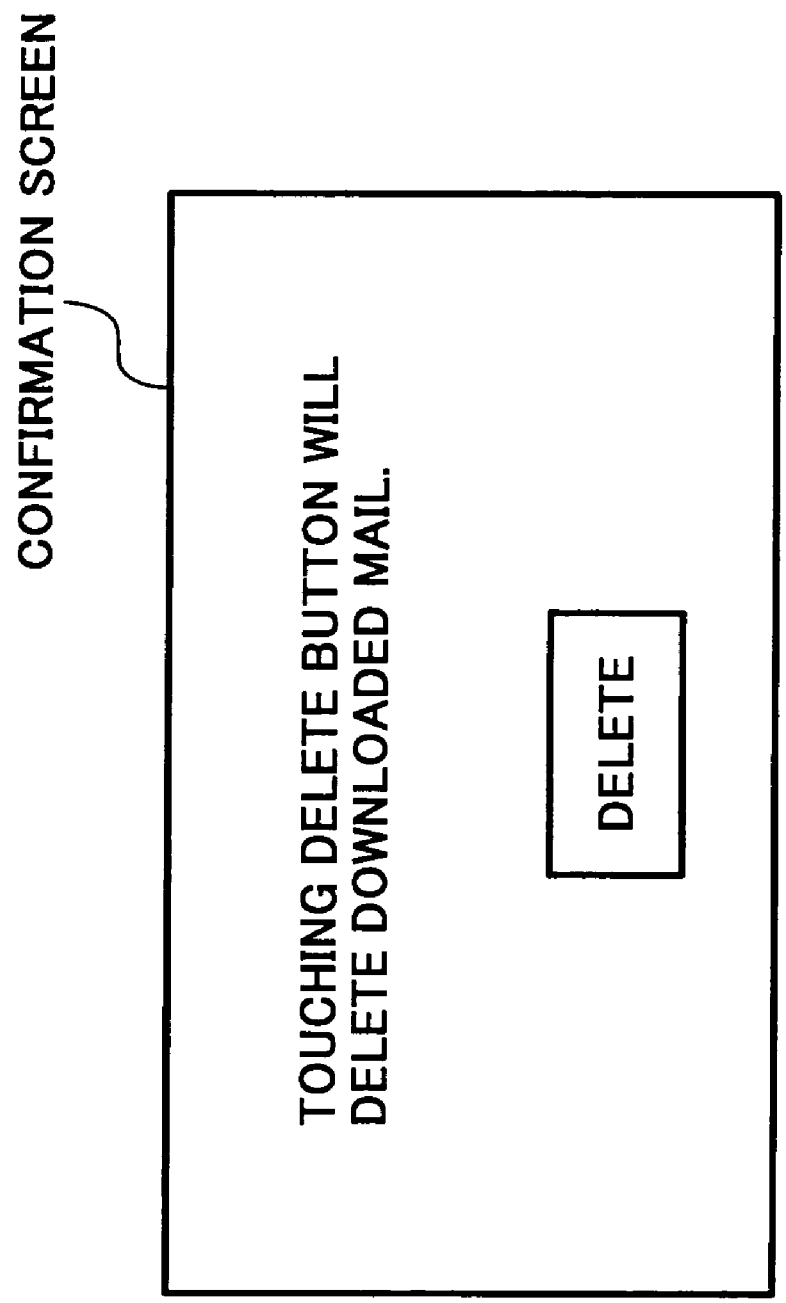
FIG. 21 is a diagram showing a confirmation screen displayed by the printer according to the second embodiment.

In this case, the printer controller 51 of the printer 40 generates data of a confirmation screen for confirming deletion of an e-mail upon completion of printing of the e-mail and outputs the data to the panel controller 43. Consequently, the printer controller 51 displays the confirmation screen as shown in FIG. 21 on the display panel 40B.

When the user touches a Delete button on the confirmation screen, an instruction to delete an e-mail is supplied to the print instructing section 44C via the input section 42 and the panel controller 43. In response to the supplied deletion instruction, the print instructing section 44C deletes the e-mail addressed to the user stored in the mail buffer 53.

This design can reliably prevent the contents of an e-mail from being read by other persons.

In the second embodiment, the index generating section 44A may download only "unopened" e-mails from the mail server 60. This design can make the mail identifying section 44B unnecessary.

Figure 16B:
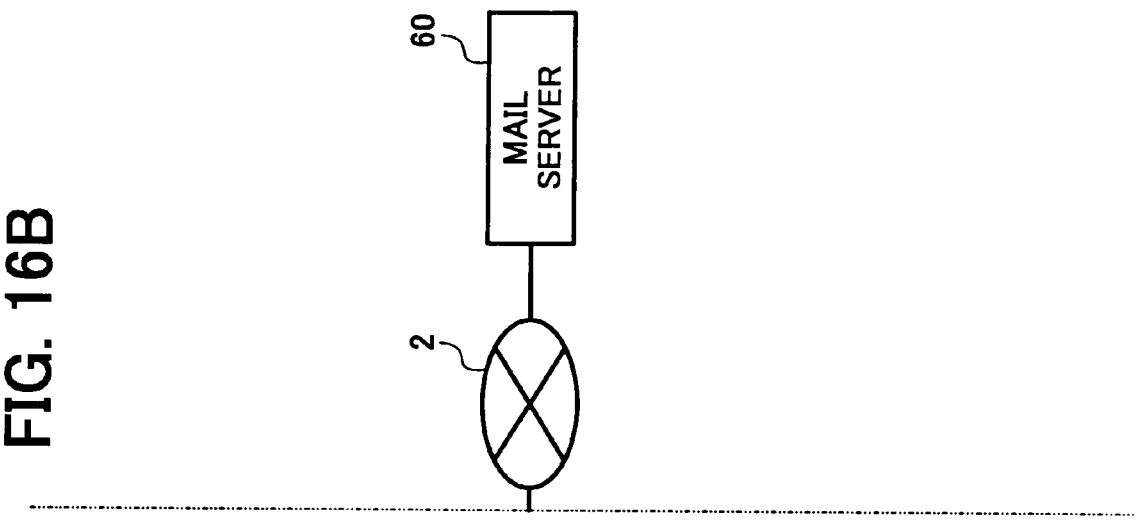
FIG. 16 is a diagram showing another structure of the printer according to the second embodiment.

The structures of the printers 40 shown in FIGS. 16 and 18 may be combined. In this case, the downloader 55 can download a statement created by the user using the terminal device 70 from the terminal device 70 and the mail sending section 44D can create and send a reply mail including the downloaded statement.

The memory card 5 according to the second embodiment may store data needed to connect the printer 40 to a plurality of mail servers 60 in case where, for example, the user has made contracts with a plurality of providers.

In this case, the index generating section 44A generates data of a server selection screen for selecting the mail server 60 to connect to and displays the serve selection screen on the display panel 40B in the aforementioned manner. Accordingly, the index generating section 44A allows the user to select the mail server 60 to connect to and downloads an e-mail addressed to the user from the mail server 60 selected by the user.

Figure 22A:
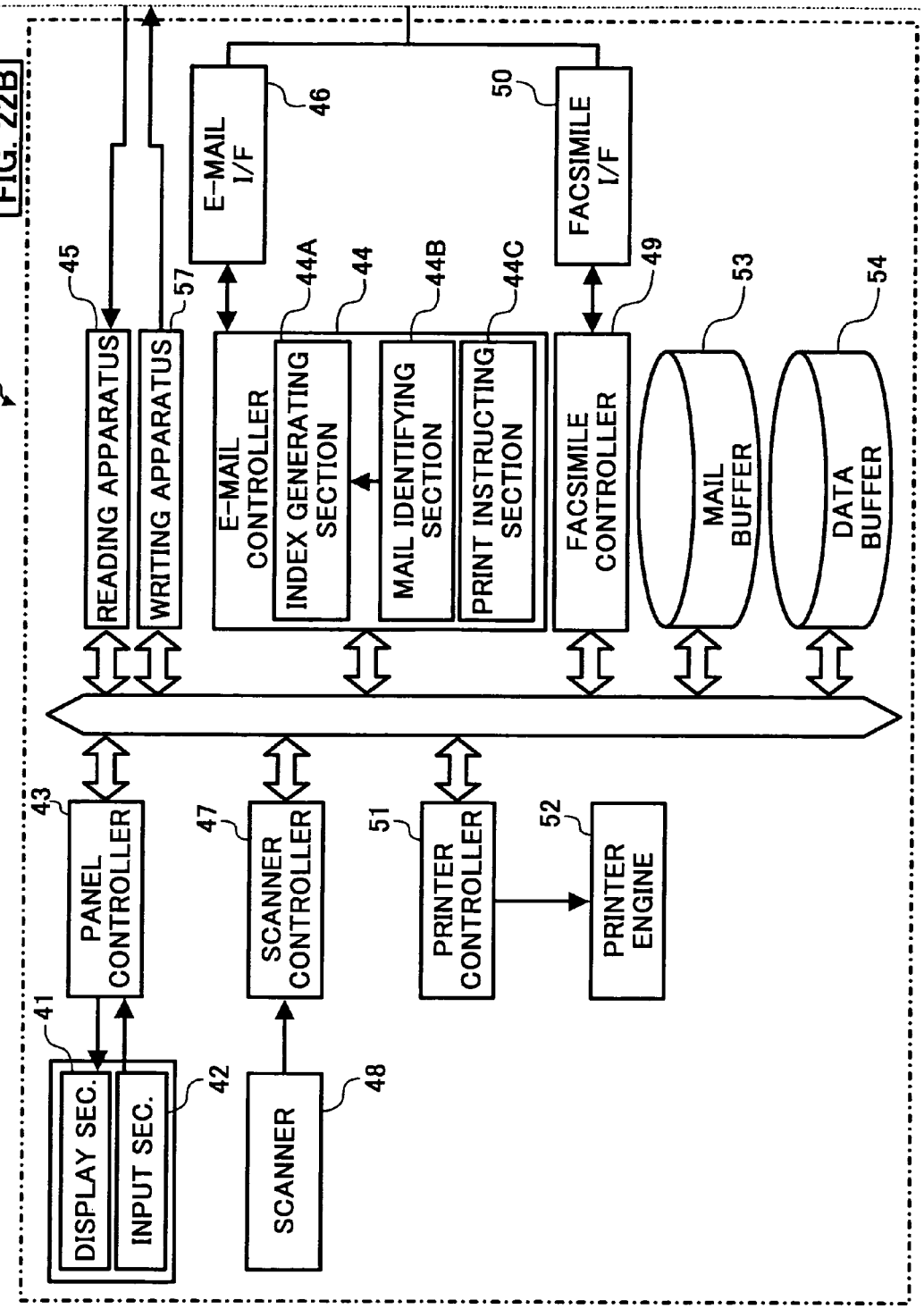
FIG. 22 is a diagram showing a different structure of the printer according to the second embodiment.

As shown in FIG. 22, the printer 40 according to the second embodiment may further include a writing apparatus 57 which writes data in the memory card 5 inserted in the card slot 40D. The index generating section 44A may supply data of an e-mail selected by the user to the writing apparatus 57 which in turn may record the supplied data of the e-mail into the memory card 5.

This modification can allow the user to reconfirm the contents of an e-mail at home and in an office or the like before executing printing. It is to be noted however that an apparatus similar to the reading apparatus 45 equipped on the printer 40 should be provided at home and in an office or the like.

The mail identifying section 44B of the e-mail controller 44 according to the second embodiment may extract not only an "unopened" e-mail but also an "opened" e-mail, all e-mails downloaded or e-mails whose reception dates lie within a predetermined period of time.

The memory card 5 according to the second embodiment can be realized by storing data for connecting the printer 40 to the mail server 60 or the terminal device 70 in an ordinary IC card or a magnetic card.

The printer 40 according to the second embodiment can be realized by adding printed circuit boards for the e-mail controller 44 and the downloader 55 to an ordinary multi-function printer (MFP) which is placed in a company or the like. This makes a large investment for equipment unnecessary.

The printer 40 according to the second embodiment may not be equipped with a facsimile capability as long as it can download and print an e-mail or a file.

The portable recording medium that is to be inserted in the printer 40 is not limited to the memory card 5. For example, the portable recording medium may be an MD (Mini Disc), CD (Compact Disc), DVD (Digital Versatile Disc) or the like.

The printers 20 according to the first embodiment may be provided in companies or public facilities as well as in shops.

The printers 40 according to the second embodiment may be provided not only in companies or public facilities but also in shops, such as convenient stores or bookstores.

The print conditions mentioned in the foregoing description of the first and second embodiments are not limited to the four print modes of "monochromatic printing, one-side printing", "monochromatic printing, double-side printing", "color printing, one-side printing" and "color printing, double-side printing". For example, the print conditions may include the settings of the direction of paper (vertical/horizontal), the density of ink and the number of copies.

The network 1 according to the first embodiment may include some of the public telephone network, WAN (Wide Area Network) and LAN (Local Area Network). The public telephone network 2 according to the second embodiment may include some of the Internet, WAN and LAN, and the Internet 3 may include some of the public telephone network, WAN and LAN.

The structures of the printing systems according to the first embodiment, the second embodiment and the modifications thereof may be combined adequately as needed in accordance with the purpose of the use of the printing systems.

The apparatus of the present invention can be realized by a general computer connectable to a printer or a general computer connectable to a printer and a reader which reads data from a portable recording medium, without the need for a dedicated apparatus. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the apparatus of the present invention. The above program and data may be stored in a disk device or the like included in the server device on the Internet, and embedded in a carrier wave. The program and data embedded in the carrier wave may be downloaded into the computer so as to realize the apparatus of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-370239 filed on Dec. 4, 2001 and Japanese Patent Application No. 2001-401306 filed on Dec. 28, 2001, and including the specifications, claims, drawings and summaries. The disclosure of the above Japanese Patent Applications are incorporated herein by reference in its entirety.

What is claimed is:

1. A printing apparatus comprising:
   a receiving unit which receives an e-mail sent from an external terminal;
   a print mode memory unit which stores a plurality of print modes to which different e-mail addresses are respectively assigned;
   a mode specifying unit which specifies a print mode to which an e-mail address indicating a destination of said e-mail received by said receiving unit is assigned in memory contents of said print mode memory unit;

a data generating unit which generates print data for printing a file attached to said e-mail received by said receiving unit; and a printing unit which prints said file by using said print data generated by said data generating unit under said print mode specified by said mode specifying unit.

2. The printing apparatus according to claim 1, wherein said printing apparatus further includes an application program memory unit which stores a plurality of application programs for generating said print data, and said data generating unit specifies an application program corresponding to a type of said file and generates said print data using said specified application program.

3. The printing apparatus according to claim 1, wherein said printing apparatus further includes:

a charge calculating unit which acquires a charge for printing said file; and a charge indicating unit which indicates said charge acquired by said charge calculating unit to a sender of said e-mail.

4. The printing apparatus according to claim 3, wherein said charge indicating unit indicates said charge to said sender by sending an e-mail indicating said charge.

5. The printing apparatus according to claim 1, wherein said printing unit starts printing in response to a print execution instruction from a sender of said e-mail.

6. The printing apparatus according to claim 5, wherein said print execution instruction is supplied to said printing unit by an e-mail.

7. The printing apparatus according to claim 1, wherein said printing apparatus further includes:

a number issuing unit which issues a receipt number to a sender of said e-mail, and a number input unit through which said sender inputs said receipt number; and said printing unit starts printing in response to said sender's inputting said receipt number by operating said number input unit.

8. The printing apparatus according to claim 3, wherein said printing apparatus further includes an amount discriminating unit which has a money slot to place money and discriminates an amount of money deposited, and said printing unit starts printing when said amount of money discriminated by said amount discriminating unit becomes equal to or greater than said charge acquired by said charge calculating unit.

9. A printing method comprising:

a mail sending step of allowing a terminal device operated by a user to send to a printing apparatus, which stores a plurality of print modes to which different e-mail addresses are respectively assigned, an e-mail to which a file to be printed is attached;

a receiving step of allowing said printing apparatus to receive said e-mail sent from said terminal device;

a mode specifying step of allowing said printing apparatus to specify a print mode to which an e-mail address indicating a destination of said received e-mail is assigned in print modes stored in said printing apparatus;

a data generating step of allowing said printing apparatus to generate print data for printing a file attached to said received e-mail; and a printing step of allowing said print apparatus to print said file by using said print data generated in said data generating step under said print mode specified in said mode specifying step.

10. A computer-readable medium storing a program for allowing a computer connectable to a printer to serve as a printing apparatus comprising:

a receiving unit which receives an e-mail to be sent from an external terminal;

a memory unit which stores a plurality of print modes to which different e-mail addresses are respectively assigned;

a mode specifying unit which specifies a print mode to which an e-mail address indicating a destination of said e-mail received by said receiving unit is assigned in memory contents of said memory unit; and a printing unit which controls said printer to print a file attached to said e-mail received by said receiving unit under said print mode specified by said mode specifying unit.

11. The printing apparatus according to claim 1, wherein said print mode memory unit stores a one-side print mode and a double-side print mode as a plurality of print modes to which different e-mail addresses are respectively assigned, and said printing unit prints said file in one-side printing in a case where said mode specifying unit specifies the one-side print mode and prints said file in double-side printing in a case where said mode specifying unit specifies the double-side print mode.

12. The printing method according to claim 9, wherein said printing apparatus stores a one-side print mode and a double-side print mode as a plurality of print modes to which different e-mail addresses are respectively assigned, and in said printing step, said file is printed in one-side printing in a case where the one-side print mode is specified in said mode specifying step and said file is printed in double-side printing in a case where the double-side print mode is specified in said mode specifying step.

13. The computer-readable medium according to claim 10, wherein said memory unit stores a one-side print mode and a double-side print mode as a plurality of print modes to which different e-mail addresses are respectively assigned, and said printing unit controls said printer to print said file in one-side printing in a case where said mode specifying unit specifies the one-side print mode and controls said printer to print said file in double-side printing in a case where said mode specifying unit specifies the double-side print mode.

14. The printing apparatus according to claim 1, wherein said print mode memory unit stores a monochromatic print mode and a color print mode as a plurality of print modes to which different e-mail addresses are respectively assigned, and said printing unit prints said file in monochrome in a case where said mode specifying unit specifies the monochromatic print mode and prints said file in color in a case where said mode specifying unit specifies the color print mode.

15. The printing method according to claim 9, wherein said printing apparatus stores a monochromatic print mode and a color print mode as a plurality of print modes to which different e-mail addresses are respectively assigned, and in said printing step, said file is printed in monochrome in a case where the monochromatic print mode is specified in said mode specifying step and said file is printed in color in a case where the color print mode is specified in said mode specifying step.

16. The computer-readable medium according to claim 10, wherein said memory unit stores a monochromatic print mode and a color print mode as a plurality of print modes to which different e-mail addresses are respectively assigned, and said printing unit controls said printer to print said file in monochrome in a case where said mode specifying unit specifies the monochromatic print mode and controls said printer to print said file in color in a case where said mode specifying unit specifies the color print mode.

* * * * *